US008364516B2

(12) United States Patent
Anderson et al.

(10) Patent No.: US 8,364,516 B2
(45) Date of Patent: Jan. 29, 2013

(54) METHODS AND APPARATUS TO DETERMINE THE EFFECTS OF TRADE PROMOTIONS ON SUBSEQUENT SALES

(75) Inventors: Gregory D. Anderson, Lisle, IL (US); John P. Mansour, North Aurora, IL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 519 days.

(21) Appl. No.: 12/493,643

(22) Filed: Jun. 29, 2009

(65) Prior Publication Data
US 2010/0169162 A1    Jul. 1, 2010

Related U.S. Application Data

(60) Provisional application No. 61/094,691, filed on Sep. 5, 2008.

(51) Int. Cl.
*G06Q 30/00* (2006.01)
(52) U.S. Cl. ....................... 705/7.29
(58) Field of Classification Search ............. 705/7.29
See application file for complete search history.

(56) References Cited

U.S. PATENT DOCUMENTS

| | | | |
|---|---|---|---|
| 6,871,183 B2 * | 3/2005 | Gilday et al. ............. | 705/14.41 |
| 7,174,304 B1 | 2/2007 | Boardman | |
| 7,660,734 B1 * | 2/2010 | Neal et al. .................... | 705/7.29 |
| 2001/0049623 A1 | 12/2001 | Aggarwal et al. | |
| 2002/0143608 A1 * | 10/2002 | Brown ........................... | 705/10 |
| 2002/0198882 A1 | 12/2002 | Linden et al. | |
| 2003/0130883 A1 * | 7/2003 | Schroeder et al. ............ | 705/10 |
| 2005/0060223 A1 | 3/2005 | Kelly et al. | |
| 2006/0010022 A1 * | 1/2006 | Kelly et al. ...................... | 705/8 |
| 2006/0047608 A1 | 3/2006 | Davis et al. | |
| 2009/0006156 A1 | 1/2009 | Hunt et al. | |

OTHER PUBLICATIONS

Ailawadi, Decomposition of the Sales Impact of Promotion-Induced Stockpiling, Jul. 25, 2006, p. 1-54.*
Leeflang et al., Decomposing the sales promotion bump accounting for cross-category effects, Intern. J. of Research in Marketing, vol. 25, 2008, p. 201-214.*
Beasly, An Examination of Stockpiling Behavior in Response to Price Deals, Academy of Marketing Studies Journal, Vo. 2, No. 1, 1998, p. 23-34.*
Chan et al., Decomposing Promotional Effects with a Dynamic Structural Model of Flexible Consumption, Journal of Marketing Research, vol. XLV, Aug. 2008, p. 487-98.*
Ailawadi et al., The Benefits of Promotion-Induced Stockpiling, May 9, 2005, p. 1-46.*
Foekens et al., Varying parameter models to accommodate dynamic promotion effects, Journal of Econometrics 89, 1999, p. 249-268.*

(Continued)

*Primary Examiner* — Justin M Pats
(74) *Attorney, Agent, or Firm* — Hanley, Flight & Zimmerman, LLC

(57) ABSTRACT

Example methods and apparatus to determine the effects of trade promotions on subsequent sales are disclosed. A disclosed example method includes determining a plurality of decremental effect factors, each corresponding to a respective one of a plurality of weeks, wherein at least some of the decremental effect factors are indicative of a downward trend in sales of a product that was under a promotion condition during a first one of the plurality of weeks. The example method also includes determining a plurality of decremental effect terms, each decremental effect term equal to the product of a corresponding coefficient multiplied by a corresponding one of the decremental effect factors, and determining a pantry loading effect term based on the plurality of decremental effect terms. Further, the example method includes determining a pantry loading incremental sub-volume based on the pantry loading effect term, and generating a report including the pantry loading incremental sub-volume.

11 Claims, 33 Drawing Sheets

OTHER PUBLICATIONS

Van Heerde et al., Decomposing the Sales Promotion Bump with Store Data, Marketing Science, vol. 23, No. 3, Summer 2004, p. 317-34.*

Persson, Modeling the Impact of Sales Promotion on Store Profits, Stockholm School of Economics, 1995, p. 1-311.*

MacDonald and Aaronson, How Do Retail Prices React to Minimum Wage Increases, Federal Reserve Bank of Chicago, 2000, p. 1-40.*

Mulqueen, Stetz, Beaubien & O'Connell, Developing Dynamic Work Roles Using Jaccard Similarity Indices of Employee Competency Data, Ergometrika, 2001, 11 pages.

Tomca, Kraus & Milutinovic, A Flexible Tool for Jaccard Score Evaluation, printed from Internet on Aug. 21, 2008, 5 pages.

Lee, A Study of Baseline Estimates, Research Paper, 2006, 8 pages.

United States Patent and Trademark Office, "Non-Final Office Action," issued in connection with U.S. Appl. No. 12/493,484, issued Dec. 30, 2011, 16 pages.

Dawes, "Assessing the Impact of a Very Successful Price Promotion on Brand, Category and Competitor Sales," The Journal of Product and Brand Management, vol. 13, No. 4/5, 2004, 12 pages.

Anderson et al., "Competitive Dynamics of Price Promotions," Jul. 15, 2001, 42 pages.

Moon et al, "Estimating Promotion Response when Competitive Promotions are Unobservable," Journal of Marketing Research, vol. XLIV, Aug. 2007, 14 pages.

Tenn, "Estimating Promotion Effects with Retailer-Level Scanner Data," Jul. 2006, 35 pages.

Kumar et al, "Measuring the Effect of Retail Store Promotions on Brand and Store Substitution," Journal of Marketing Research, vol. XXV, No. 2, May 1998, 8 pages.

Rival Watch Screen Shots, 2000-2003, 82 pages.

Naik et al., "Planning Marketing Mix Strategies in the Presence of Interaction Effects: Empirical and Equilibrium Analyses," Apr. 2003, 54 pages.

United States Patent and Trademark Office, "Non-Final Office Action," issued in connection with U.S. Appl. No. 12/493,495, issued Nov. 14, 2011, 37 pages.

Luo, "Examine the Factors Influencing Brand-Switching: The Effects of Advertising and Promotion," Diss. 2006. Web. http://edissertations.nottingham.ac.uk/326/1/06MAlizz119.pdf, 105 pages.

United States Patent and Trademark Office, "Final Office Action," issued in connection with U.S. Appl. No. 12/493,484, issued Jul. 27, 2012, 33 pages.

United States Patent and Trademark Office, "Final Office Action," issued in connection with U.S. Appl. No. 12/493,495, issued Jul. 19, 2012, 42 pages.

* cited by examiner

1. General
    a. Source data is assumed to be "POS/OT" file equivalent
        i. Store-week
        ii. Aggregated to the Modeling Group ("Item") level.
    b. Variables to be saved in the Ready-To-Model file are in bold.
2. Record Keys/Attributes
    a. PSEUDO
    b. WEEK
    c. ITEM
3. Dependent Variable
    a. LUNITS=log(Units)
4. Weighting Variable
    a. WEIGHT = Units
5. Target Regular Price
    a. LREGPR=log(Regular Price)
6. Number of UPCs Selling
    a. LNUMUPC=log(Number UPCs Selling)
7. Target Causal Facts  ⎫ 1702
    a. Promoted Price Index (LPPI)
        i. If Actual Price/Regular Price < .96 then LPPI=log(Actual Price/Regular Price), else LPPI=0
    b. Causal Condition Intercepts (TPR, FEATURE, DISPLAY, FEATDISP)
        i. If Actual Price/Regular Price < .96 and CAUSAL=0 then TPR=1, else TPR=0
        ii. If CAUSAL in(1 2 3) then FEATURE=1, else FEATURE=0
        iii. If CAUSAL in(4) then DISPLAY=1, else DISPLAY=0
        iv. If CAUSAL in( 5 6 7) then FEATDISP=1, else FEATDISP=0
8. Seasonality and Trend Index  ⎫ 1704
    a. Calculate LBUNITS=log(Base Units)
    b. Mean-center LBUNITS by store-item.
    c. SEASON = Average of LBUNITS across stores within an outlet and census division, and across Modeling Groups (items), by Category Segment (LEVEL3) and Week.
        i. Note that this means there is a unique value of SEASON for each Category Segment, Outlet, Census Division, Week.
    d. TREND = log(WEEK)
9. Forward Buy (Pantry Loading) Cannibalization Terms  ⎫ 1706
    a. Calculate LIFT = log(Units/Base Units) if {(TPR=1 or CAUSAL >0) and Base Units >0 and Units>Base Units), LIFT=0 otherwise
    b. Create a series of 1 to N_LAGS week time-lagged values of LIFT.
        i. For each store-week-item, Subtract 1 from the week number and assign LIFT1=LIFT, e.g. LIFT1 represents the transformed lift of the prior week.
        ii. Subtract 2 from the week number and assign LIFT2=LIFT
        iii. ...
        iv. Subtract n_lags from the week number and assign LIFTn_lags=LIFT
        v. Join the values LIFT1-LIFTn_lags to the store-week-item RTM data using the adjusted week numbers.
        vi. Note that n_lags is a subjectively determined number of lags, so we should treat this as a variable study parameter. For a default I would suggest n_lags=6.
10. Competitive Effects
    a. Jaccard-Weighted Category Trade, Regular Price, and Distribution
        i. Identify the "target item" as Item i, and the "competitive item" as Item k.
        ii. A separately documented process will provide Jaccard and Brand weights for each pair of items. For each (i,k) pair, denote the Jaccard weight as J(i,k) and the Brand weight as B(i,k).

FIG. 17A

1. Note that J(i,i)= B(i,i)==0.
2. Assume J(i,k) or B(i,k) are zero if a value is not provided or is missing.

iii. For a given store-week, let EQVOL(k), BEQVOL(k), TPR(k) and CAUSAL(k) denote the value of Equivalent Volume, Base Equivalent Volume, TPR and CAUSAL for item k respectively.

iv. Competitive Trade Index
1708 {
1. Loop over all values of i=1 to max(i).
2. If {(TPR(k)=1 or CAUSAL(k)>0) and EQVOL(k)>BEQVOL(k) and BEQVOL(k) ne 0} then
    i. Raw Jaccard Volume (i,k) = J(i,k) * (EQVOL(k) - BEQVOL(k))
    ii. Raw Brand Volume (i,k) = B(i,k) * (EQVOL(k) - BEQVOL(k))
3. Sum by store-week-i across all values of k=1 to max(k) to create
    i. Total Raw Jaccard Volume =sum over k of Raw Jaccard Volume (i,k).
    ii. Total Raw Brand Volume =sum over k of Raw Brand Volume (i,k).
    iii. This results in one record per store-week-item, where item=i.
4. Join values of Total Raw Jaccard Volume and Total Raw Brand Volume to the store-week-item RTM file.
5. JACCARD_TRADE=tanh(Total Raw Jaccard Volume / max(BEQVOL(i),1)), where BEQVOL(i) is the target (item=i) Base Eq Volume. If Total Raw Jaccard Volume is missing, set JACCARD_TRADE=0
    i. Note: the max(BEQVOL,1) function is to be used only when working with rounded eq volume data.
6. BRAND_TRADE=tanh(Total Raw Brand Volume / max(BEQVOL(i),1)), where BEQVOL(i) is the target (item=i) Base Eq Volume. If Total Raw Brand Volume is missing, set BRAND_TRADE=0
    i. Note: the max(BEQVOL,1) function is to be used only when working with rounded eq volume data.

v. Competitive Regular Price
1710 {
1. For all store-week-item records, calculate a store-item mean-centered (see below) value of log(Regular Price). Call this LREGPR(k).
2. Remaining Category Price Variable
    i. For each store-week-i loop across all values of k=1 to max(k) to create JACCARD_PRICE =sum over k of J(i,k) * LREGPR(k). This results in one value per store-week-item, where item=i.
    ii. Join values of JACCARD_PRICE to the store-week-item RTM file. If JACCARD_PRICE is missing set it to zero.
3. Within-Brand Price Variable
    i. For each store-week-i loop across all values of k=1 to max(k) to create BRAND_PRICE =sum over k of B(i,k) * LREGPR(k). This results in one value per store-week-item, where item=i.

FIG. 17B ii. Join values of BRAND_PRICE to the store-
      week-item RTM file. If BRAND_PRICE is
      missing set it to zero.
  vi. Competitive Distribution
    1. For all store-week-item records, calculate
      i. NUMUPC = number UPCs selling. (Note this is a
       standard POS fact, so it will need to be
       computed at the time of item aggregation).
      ii. QUADWEEK number as
       QUADWEEK=integer((Week Number -1)/4).
    2. Compute the MEAN_NUMUPC = mean of NUMUPC by store-
     QUADWEEK-item.
    3. Define SELL=1 if mean of MEAN_NUMUPC>0, 0 otherwise.
    4. Join the values of mean MEAN_NUMUPC and SELL back to the
     store-week-item records mapping to the corresponding store-
     QUADWEEK-item values. Effectively this smoothes slow moving
     item sales over a 4 week window.
    5. Remaining Category Distribution Variable
      i. For each store-week-i loop across all values of
       k=1 to max(k) to create JACCARD_DIST =sum
       over k of J(i,k) * SELL(k). This results in one
       value per store-week-item, where item=i.
      ii. Join values of JACCARD_DIST to the store-
       week-item RTM file. If JACCARD_DIST is
       missing set it to zero.
      iii. Calculate LJACCARD_DIST = log(1 +
       JACCARD_DIST).
    6. Within-Brand Distribution Variable
      i. For each store-week-i loop across all values of
       k=1 to max(k) to create BRAND_DIST =sum
       over k of B(i,k) * MEAN_NUMUPC(k). This
       results in one value per store-week-item, where
       item=i.
      ii. Join values of BRAND_DIST to the store-week-
       item RTM file. If BRAND_PRICE is missing set it
       to zero.
      iii. Calculate LBRAND_DIST = log(1 +
       BRAND_DIST).

(1712)

11. Mean Centering
  a. All Dependant and Independent Variables above are to be mean-centered by
   store-modeling group.
    i. Calculate mean of each variable by Pseudo-Item (average across
     weeks)
    ii. Subtract mean of each variable from the corresponding value in each
     store-item-week record.
    iii. Note: weighting variable UNITS is not mean-centered.
12. Interaction Variables
  a. A number of the above independent variables will also be included in interaction
   effects with other variables.
    i. The independent variable should be mean-centered first, and then
     multiplied with each interaction variable in its "Interaction Set" to create
     an additional independent variable.
    ii. It would be preferable to store the raw interaction variables and perform
     the multiplication on the fly.
      1. A user interface would define the various interaction sets and
       would allow for model customization

FIG. 17C

- 2. Pre-calculating the products and storing them is preferred if performance would be greatly improved.
- b. Listing of Interaction Variables
    - i. Supergroup Factors
        - 1. SUPER1-SUPERn
        - 2. Variable number n by outlet
    - ii. Spectra Trading Area Demographics
        - 1. Percent Black PBLACK
        - 2. Percent Hispanic PHISP
        - 3. Standardized Rank Scores for
            - 1. Latitude LATSCORE
            - 2. Longitude LONGSCORE
    - iii. Item-Cell Lift Adjustment
        - 1. Select store-week-item records {(TPR=1 or CAUSAL >0) and Units > Base Units and Base Units >0}
        - 2. Calculate LOGLIFT = log(Units/Base Units )
        - 3. Fit a single (pooled across all items) random coefficients regression model
            - i. LOGLIFT = beta1*LPPI + beta2*TPR + beta3*DISPLAY + beta4*FEATURE + beta5*FEATDISP
            - ii. LPPI has random subject CAUSTYPE (see "Random Coefficient Subject Variables" below)
            - iii. FEATURE, FEATDISP has random subject ADSIZE
            - iv. DISPLAY, FEATDISP has random subject DISPLOC
            - v. LPPI, TPR, FEATURE, DISPLAY, FEATDISP have random subject Level5
            - vi. LPPI, TPR, FEATURE, DISPLAY, FEATDISP have random subject Outlet
            - vii. Use the quantity Incremental Units (defined as Units - Base Units) as the weight in the model estimation
        - 4. Calculate the predicted value (PRED) and the residual (RESID) from this model
        - 5. Calculate LIFT_ADJUST = tanh[ weighted mean (RESID/PRED) by ITEM, PSEUDO]. The weight is Incremental Units as defined above. Note that the tanh transformation is applied to the mean value.
        - 6. Join these values back to the RTM data by ITEM, PSEUDO. Set LIFT_ADJUST=0 if missing.
- 13. Random Coefficient Subject Variables
    - a. Causal Type Subject Variables
        - i. Causal Type (CAUSTYPE)
            - 1. If CAUSAL in(0) then CAUSTYPE="N"
            - 2. If CAUSAL in(1 2 3) then CAUSTYPE="F"
            - 3. If CAUSAL in(4) then CAUSTYPE="D"
            - 4. If CAUSAL in(5 6 7) then CAUSTYPE="FD"
        - ii. Feature Ad Size (ADSIZE)
            - 1. If CAUSAL in (1 5) then ADSIZE="L"
            - 2. Else If CAUSAL in (3 7) then ADSIZE="C"
            - 3. Otherwise ADSIZE="M"
        - iii. Display Location (DISPLOC)
            - 1. If CAUSAL in (4 5 6 7) set DISPLOC to value from causal detail field

FIG. 17D i. F(Front)
    ii. E(End of Aisle)
    iii. I(In Aisle)
    iv. S(Special)
    v. L(Lobby)
    vi. R(Rear)
    vii. O(Other)
   2. If CAUSAL in (0 1 2 3) set DISPLOC=F.
 b. Item Characteristic Subject Variables
   i. An externally generated file mapping item number to a variable number (currently 3) of subject variables will be provided.
   ii. One of these subject variables will be used to split the data into separate model estimation runs.
 c. Store Characteristic Subject Variables
   i. Store outlet type (OUTLET)

FIG. 17E

1. Source Data
    a. Spectra Trading Area ACV File
        i. Maintained by MSci (Craig Agger)
        ii. Updated monthly
        iii. Contains trading are acv overlap for pairs of stores
        iv. Store key is TDLinx id
    b. On-Demand Store Reference File
        i. Maintained by MSci
        ii. Contents
        1. Org-Store
        2. Pseudo
        3. TDLinx
        4. Inactive Date
    c. Jaccard-Weighted Incremental Volume
        i. Created for scoring Brand and Jaccard Trade Volumes
        ii. Census and sample stores
        iii. Note: the measures are the jaccard weighted sums prior to division by item base sales and log(1+X) transformation.
    d. Ready-To-Model File per current specifications.
2. Target-Competitive Store Map Table Preparation
    a. Create Competitive Trading Area Table, containing.
        i. Target Store (should be Format T Store ID)
        ii. List of Competitive stores (Format T Store ID) having
            1. Same Geography as defined by Spectra Trading Area ACV File
                i. State
                ii. County
                iii. Census Tract
                iv. Census Block Group
            2. Exclude competitive stores having same ORG as target store
        iii. For each store pair, calculate %ACV Overlap as Spectra Trading Area ACV Overlap / Target Store ACV.
        iv. Keep only target/competitive store pairs where %ACV Overlap > 0.
            1. Note: we may set a higher threshold at a later date as needed.
    b. Note: SAS code performing these operations is called step1_getoverlap.sas
        i. Programmer:
        ii. Supported by:
        iii. This process could be run as part of project setup/refresh in sun00 (could also be run on Neteeza). The only client category-specific content is the final mapping to Format T Store ID.
3. Calculate independent variables for inclusion in model.
    a. Select a (Target) Store-Item-Week record in the Ready-To-Model File.
    b. Look up all Competitive Stores for the Target Store in the Target-Competitive Store Map Table
    c. Calculate %ACV Overlap Weighted Mean Brand and Jaccard Incremental Volume (separately) from the Jaccard-Weighted Incremental Volume File for all stores identified as a Competitive Store, and for the selected Item-Week.
    d. The result is a table of summed Brand and Jaccard Incremental Volume for all competitive stores for each target store, item, and week.
    e. Join this table to the Ready-To-model file.
    f. Calculate the final independent variables
        i. BRAND_STORE_SWITCHING = log(1 + Total Brand Incremental Volume / BEQVOL), where BEQVOL is the target item Base Eq Volume. If Total Brand Volume is missing, set BRAND_STORE_SWITCHING =0
        ii. JACCARD_STORE_SWITCHING = log(1 + Total Jaccard Incremental Volume / BEQVOL), where BEQVOL is the target item Base Eq Volume.

FIG. 18A

If Total Jaccard Volume is missing, set JACCARD_STORE_SWITCHING =0
   g. Mean Center by store-item per the other independent variables.
4. Model Specification for Store Switching Variables
   a. Variables 3.f.i and 3.f.ii are included as
      i. Fixed effects
      ii. Random effects with subject=outlet
      iii. Random Effects with subject=Level5
      iv. The net coefficient for each term (fixed + random effect) should be <=0.
5. Due-To Driver Scoring Calculations
   a. Construct the BRAND_STORE_SWITCHING and JACCARD_STORE_SWITCHING variables as in section 3 above for all stores (census and sample), except do not mean center them.
   b. Using the appropriate model coefficients for each term, calculate
      i. BETAX_BRAND_XSTORE = Coefficient X BRAND_STORE_SWITCHING
      ii. BETAX_JACCARD_XSTORE = Coefficient X JACCARD_STORE_SWITCHING
   c. Calculate
      i. Brand XStore Switching Net Due-To Volume = { exp(BETAX_Brand_XSTORE) -1 } X maximum of [ UNITS, Base Units ]
      ii. Brand XStore Switching Base Due-To Volume = Brand XStore Net Due-To Volume X { Base Units / maximum of [ UNITS, Base Units ] }
      iii. Brand XStore Switching Incremental Due-To Volume = Brand Xstore Switching Net Due-To Volume - Brand XStore Switching Base Due-To Volume
      iv. Jaccard XStore Switching Net Due-To Volume = { exp(BETAX_Jaccard_XSTORE) -1 } X maximum of [ UNITS, Base Units ]
      v. Jaccard XStore Switching Base Due-To Volume = Jaccard XStore Net Due-To Volume X { Base Units / maximum of [ UNITS, Base Units ] }
      vi. Jaccard XStore Switching Incremental Due-To Volume = Jaccard XStore Switching Net Due-To Volume - Jaccard XStore Switching Base Due-To Volume
   d. The Base and Incremental terms will need to be handled throughout the remaining scoring logic in the same way as the Brand Trade and Jaccard Trade Driver terms when calculating base residual volume, lift factor adjustments, etc.

FIG. 18B

1. Dependent Variable
    a. LUNITS
2. Weighting Variable
    a. WEIGHT
3. Fixed Effects
    a. LREGPR
    b. LNUMUPC
    c. LPPI
    d. TPR
    e. FEATURE
    f. DISPLAY
    g. FEATDISP
    h. SEASON
    i. TREND
    j. JACCARD_VOL
    k. BRAND_VOL
    l. JACCARD_PRICE
    m. BRAND_PRICE
    n. JACCARD_DIST
    o. BRAND_DIST
    p. JACCARD_STORE_SWITCHING
    q. BRAND_STORE_SWITCHING
    r. LIFT1-LIFTn
    s. LREGPR*ITEM_LIFT
    t. LPPI*ITEM_LIFT
    u. TPR*ITEM_LIFT
    v. FEATURE*ITEM_LIFT
    w. DISPLAY*ITEM_LIFT
    x. FEATDISP*ITEM_LIFT
4. Random Effects
    a. Random Subject = CAUSTYPE
        i. LPPI
    b. Random Subject = ADSIZE
        i. FEATURE
        ii. FEATDISP
    c. Random Subject = DISPLOC
        i. DISPLAY
        ii. FEATDISP
    d. Random Subject = OUTLET
        i. LREGPR
        ii. LNUMUPC
        iii. LPPI
        iv. TPR
        v. FEATURE
        vi. DISPLAY
        vii. FEATDISP
        viii. SEASON
        ix. TREND
        x. LIFT1-LIFTn
        xi. LREGPR*SUPER1 .... LREGPR*SUPERn
        xii. LREGPR*PBLACK
        xiii. LREGPR*PHISP
        xiv. LREGPR*LATSCORE
        xv. LREGPR*LNGSCORE
        xvi. JACCARD_VOL
        xvii. BRAND_VOL

FIG. 19A xviii. JACCARD_PRICE
        xix. BRAND_PRICE
        xx. JACCARD_STORE_SWITCHING
        xxi. BRAND_STORE_SWITCHING
  e. Random Subject = LEVEL5
        i. LREGPR
        ii. LNUMUPC
        iii. LPPI
        iv. TPR
        v. FEATURE
        vi. DISPLAY
        vii. FEATDISP
        viii. SEASON
        ix. TREND
        x. JACCARD_VOL
        xi. BRAND_VOL
        xii. JACCARD_PRICE
        xiii. BRAND_PRICE

FIG. 19B

1. General
    a. Source data is Census data
        i. Store-week
        ii. UPC level.
    b. Zero sales weeks are to be used in all calculations
        i. Exclude base units =0.
    c. Variables to be reported as Driver Due-To's or saved for use in later calculations are in bold.
2. Coefficient Preparation
    a. Model coefficients are to be transformed into store-UPC values.
        i. Set non-significant fixed and random effect coefficients to zero.
            1. Nominal significance level is 0.1.
        ii. Calculate net Store-UPC values by adding appropriate fixed and random effects as well as net interaction terms.
        iii. Check net results for sign violations per constraint table.

2002 {
3. Calculate independent variables per Ready To Model file specifications
    a. Log Regular Price LREGPR
    b. Decremental Effects
        i. Forward Buy (Pantry Loading) Cannibalization Terms LIFT1-LIFTn
        ii. Jaccard-Weighted Category Trade JACCARD_TRADE and BRAND_TRADE
        iii. Jaccard-Weighted Regular Price JACCARD_PRICE and BRAND_PRICE
        iv. Jaccard-Weighted Distribution LJACCARD_DIST and LBRAND_DIST
4. Mean-Center the following independent variables by Store-UPC
    i. Log Regular Price LREGPR
    ii. Jaccard-Weighted Regular Price JACCARD_PRICE and BRAND_PRICE
    iii. Jaccard-Weighted Distribution LJACCARD_DIST and LBRAND_DIST
}

5. Calculate Reference Base Units MEAN_BASE by UPC, Store

2004 {
6. Calculate Product of Store-UPC Coefficients ("beta") and Independent Variables ("X") for the following terms:
    a. BETAX_LREGPR
    b. BETAX_LIFT1 - BETAX_LIFTn
        i. Calculate BETAX_PANTRY as sum of BETAX_LIFT1 - BETAX_LIFTn
    c. BETAX_ JACCARD_TRADE
    d. BETAX_BRAND_TRADE
    e. BETAX_ JACCARD_PRICE
    f. BETAX_ BRAND_PRICE
    g. BETAX_ JACCARD_DIST
    h. BETAX_ BRAND_DIST
}

2006 {
7. Calculate Base Driver Due-To Volumes
    a. Regular Price Due-To Volume = { 1 - [ 1 / exp(BETAX_LREGPR) ]} X MEAN_BASE
        i. Note: If REGPR=.01 then set Regular Price Due-To Volume to zero.
    b. Using the functional form in a. (Regular Price Due-To Volume) with the appropriate BETAX values, calculate the following effects:
        i. Jaccard Price Due-To Volume
        ii. Brand Price Due-To Volume
        iii. Jaccard Distribution Due-To Volume
        iv. Brand Distribution Due-To Volume
    c. Pantry Loading Net Due-To Volume = { 1 - [ 1 / exp(BETAX_PANTRY) ] } X maximum of [ UNITS, Base Units ]
        i. Pantry Loading Base Due-To Volume =
           Pantry Loading Net Due-To Volume
           X { Base Units / maximum of [ UNITS, Base Units ] }
        ii. Pantry Loading Incremental Due-To Volume =
            Pantry Loading Net Due-To Volume
}

FIG. 20A

- Pantry Loading Base Due-To Volume
d. Using the functional form in c. (Pantry Loading Net Due-To Volume) with the appropriate BETAX values, calculate the following effects:
   i. Competitive Trade
      1. Jaccard Trade Net Due-To Volume
      2. Jaccard Trade Base Due-To Volume
      3. Jaccard Trade Incremental Due-To Volume
   ii. Same Brand Trade Cannibalization
      1. Brand Trade Net Due-To Volume
      2. Brand Trade Base Due-To Volume
      3. Brand Trade Incremental Due-To Volume
e. Note: The sum of Pantry Loading Incremental Due-To Volume, Jaccard Trade Incremental Due-To Volume, and Brand Trade Incremental Due-To Volume should be added to the Raw Trade Driver Volume as defined in the Incremental Trade Driver Scoring Documentation, section 4.d.7. This is to be dome for causal sample stores only.
f. Calculation of Market Driver Volume
   i. Compute Total Category Base Equivalent Units by store, week. Note that it is important to use equivalent units here, not units.
   ii. Calculate Average Category Base EQ Units by store (the simple mean of Total Category Base EQ Units across weeks within a store)
   iii. Calculate Category Index
       = Total Category Base EQ Units / Average Category Base EQ Units
   iv.
   v. Note: We will want to expand this measure to separate seasonality and trend effects in a future release.

2008 g. Calculate Base Residual Volume = Base Units - sum of
   ( Regular Price Due-To Volume + Jaccard Price Due-To Volume
   + Brand Price Due-To Volume + Jaccard Distribution Due-To Volume
   + Brand Distribution Due-To Volume + Pantry Loading Base Due-To Volume
   + Jaccard Trade Base Due-To Volume + Brand Trade Base Due-To Volume
   + Market Driver Volume)
h. Calculate Distribution Volume = mean of Base Residual Volume by Store-UPC
   i. Note that this is a constant value within a store-UPC. It is (implicitly) set to zero if Base Units=0.
   ii. Note: As other base volume drivers are introduced (e.g. category trend effects) they will need to be subtracted from Base Residual Volume prior to this step.

FIG. 20B

1. General Comments
    a. The methodology detailed below describes scoring for equivalent (eq) units. Scoring can alternatively be done on units, with equivalent unit facts derived from the scored units data using the appropriate equivalency factors.
    b. Scored dollar facts are problematic given the confounds among promotional volume lifts and promoted prices, so for now dollar-based trade driver scoring facts are not detailed. They will be revisited later.
    c. Baseline driver facts are described in a separate document.
2. Coefficient Preparation
    a. Model coefficients are to be transformed into store-UPC values.
        i. Set non-significant fixed and random effect coefficients to zero.
            1. Nominal significance level is 0.1.
        ii. Calculate net Store-UPC values by adding appropriate fixed and random effects as well as net interaction terms.
        iii. Check net results for sign violations per constraint table.
3. Reference Facts
    a. We will need to calculate and store a number of reference (average) values for use in the scoring.
    b. These facts will be calculated once a year or whenever a refresh is done. The averages should be done on all weeks present in the category data.
    c. For each fact we want to compute N, the number of store-week-upcs used for the calculation, for diagnostic purposes.
    d. Reference Fact Names and Definitions
        i. Reference Base Eq Units (REFBE). Average of Base EQ Units by UPC-store.
        ii. Reference Promoted Price Index (PPI) By Condition. This is calculated as the average across all UPCs and stores for weeks when the specified condition is present of the ratio {Actual Price / Regular Price}. The conditions are:
            1. Feature Only
            2. Display Only
            3. Feature and Display
            4. Price Cut Only
        Note that this calculation is not UPC- or store-specific. There will be only four values resulting, one for each condition.
4. Trade Incremental Volume Drivers
    a. The trade incremental volume drivers are calculated using store-week-upc level data.
    b. Model Coefficients Required. Note that the model provides store-specific coefficients. This is not explicitly notated below.
        i. Beta_LPPI
        ii. Beta_TPR
        iii. Beta_FEATURE
        iv. Beta_DISPLAY
        v. Beta_FEATDISP
    c. Facts Required.
        i. Equivalent Volume
        ii. Base Equivalent Volume (BE)
        iii. Actual Price
        iv. Regular Price
        v. Causal (values 0-7)
        vi. TPR flag (1 if price cut, 0 otherwise )
        vii. Reference Facts (see above)
    d. Calculation of Raw Incremental Volume Drivers.
        i. Incremental Equivalent Volume = Equivalent Volume - Base Equivalent Volume

FIG. 21A ii. Raw Driver Volumes by Causal Type.
  1. Price Cut Only (if CAUSAL = 0 and TPR=1)
     a. Price Cut Only Quantity (Raw) = { exp(Beta_TPR) * [ (Reference PPI For Price Cut Only)^Beta_LPPI ] -1 } * REFBE
     b. Price Cut Only Price (Raw) = { exp(Beta_TPR) * [ (Actual Price/Regular Price) ^Beta_LPPI ] - 1 } * REFBE - Price Cut Only Quantity (Raw)
  2. Feature Only (if CAUSAL = 1, 2, or 3)
     a. Feature Only Quantity (Raw) = { exp(Beta_FEATURE) * [ (Reference PPI For Feature Only)^Beta_LPPI ] -1 } * REFBE
     b. Feature Only Price (Raw) = { exp(Beta_FEATURE) * [ (Actual Price/Regular Price) ^Beta_LPPI ] - 1 } * REFBE - Feature Only Quantity (Raw)
  3. Display Only (if CAUSAL = 4)
     a. Display Only Quantity (Raw) = { exp(Beta_DISPLAY) * [ (Reference PPI For Display Only)^Beta_LPPI ] -1 } * REFBE
     b. Display Only Price (Raw) = { exp(Beta_DISPLAY) * [ (Actual Price/Regular Price) ^Beta_LPPI ] - 1 } * REFBE - Display Only Quantity (Raw)
  4. Feature and Display (if CAUSAL = 5, 6, or 7)
     a. Feature And Display Quantity (Raw) = { exp(Beta_FD * [ (Reference PPI For Feature and Display)^Beta_LPPI ] - 1 } * REFBE
     b. Feature And Display Price (Raw) = { [ (Actual Price/Regular Price) ^Beta_LPPI ] - 1 } * REFBE - Feature And Display Quantity (Raw)
  5. Raw Net Price and Quantity Volume =
     Price Cut Only Quantity (Raw) + Price Cut Only Price (Raw)
     + Feature Only Quantity (Raw) + Feature Only Price (Raw)
     + Display Only Quantity (Raw) + Display Only Price (Raw)
     + Feature And Display Quantity (Raw)
     + Feature And Display Price (Raw)
  6. Raw Base Effectiveness Volume = (BE/REFBE - 1 ) * Raw Net Price and Quantity Volume
  7. Adjusted Incremental Volume = Incremental Units
     - Pantry Loading Incremental Due-To Volume
     - Jaccard Trade Incremental Due-To Volume
     - Brand Trade Incremental Due-To Volume
  8. Raw Trade Driver Volume = Raw Net Price and Quantity Volume + Raw Base Effectiveness Volume e. Calculation of Incremental Volume Adjustment Factors. This step is to be performed at initial setup and at each update.
  i. Calculate the following quantities by UPC, Store for sample stores with a promotion condition.
  ii. Calculated values
    1.
    2. Total Raw Trade Driver Volume
    3. Total Incremental Equivalent Volume
    4. Lift Factor Adjustment = Adjusted Incremental Volume / Total Raw Trade Driver Volume f. Calculation of Final Trade Driver Volumes.
  i. Driver Volumes by Causal Type.

FIG. 21B

1. {Condition} Quantity = Lift Factor Adjustment * {Condition} Quantity (Raw)
2. {Condition} Price = Lift Factor Adjustment * {Condition} Price (Raw)

ii. Base Effectiveness Volume = Lift Factor Adjustment * Raw Base Effectiveness Volume iii. Effectiveness by Causal Type. For each casual type,
{Condition} Effectiveness = Incremental Equivalent Volume
 - ( Base Effectiveness Volume
 + {Condition} Quantity + {Condition} Price )

Note: this works since conditions are mutually exclusive so nothing is double counted

FIG. 21C

METHODS AND APPARATUS TO DETERMINE THE EFFECTS OF TRADE PROMOTIONS ON SUBSEQUENT SALES

RELATED APPLICATION

This patent claims the benefit of U.S. provisional application Ser. No. 61/094,691, filed on Sep. 5, 2008, which is hereby incorporated by reference herein in its entirety.

FIELD OF THE DISCLOSURE

The present disclosure relates generally to monitoring sales and, more particularly, to methods and apparatus to determine the effects of trade promotions on subsequent sales.

BACKGROUND

Retail establishments and product manufacturers are often interested in the shopping activities, behaviors, and/or habits of consumers. Consumer activity related to shopping can be used to correlate product sales with particular shopping behaviors and/or to improve timings or placements of product offerings, product promotions, and/or advertisements. Known techniques for monitoring consumer shopping activities include conducting surveys, counting patrons, and/or conducting visual inspections of shoppers or patrons in the retail establishments.

Trade promotions for consumer goods often result in additional or incremental unit sales of a product in the week the trade promotion is run. This effect can be referred to as the pantry loading effect, which is associated with the tendency of consumers to stock up their households with those products to which trade promotions apply. Although the pantry loading effect may result from a sudden increase in product sales at a particular time when a promotion on that product was run, this effect often causes consumers to delay subsequent purchases of that same product. Thus, although offering trade promotions provides retailers and manufacturers a means by which to move large volumes of stock in a short amount of time, such promotions often result in a reduction of later purchases leading to lowering sales trends in subsequent weeks. Reduced sales volumes are often attributed to numerous factors. That is, the pantry loading effect may not be the only factor leading to reduced sales.

BRIEF DESCRIPTION OF THE DRAWINGS

FIGS. 17A-17E illustrate example pseudo code to prepare data for modeling in connection with the example system of FIG. 1.

FIGS. 18A and 18B illustrate example pseudo code to prepare data for store switching calculations in connection with the example system of FIG. 1.

FIGS. 19A and 19B illustrate example pseudo code to specify model parameters in connection with the example system of FIG. 1.

FIGS. 20A and 20B illustrate example pseudo code to perform base driver scoring calculations in connection with the example system of FIG. 1.

FIGS. 21A-21C illustrate example pseudo code to perform incremental trade driver scoring calculations in connection with the example system of FIG. 1.

DETAILED DESCRIPTION

Figure 1:
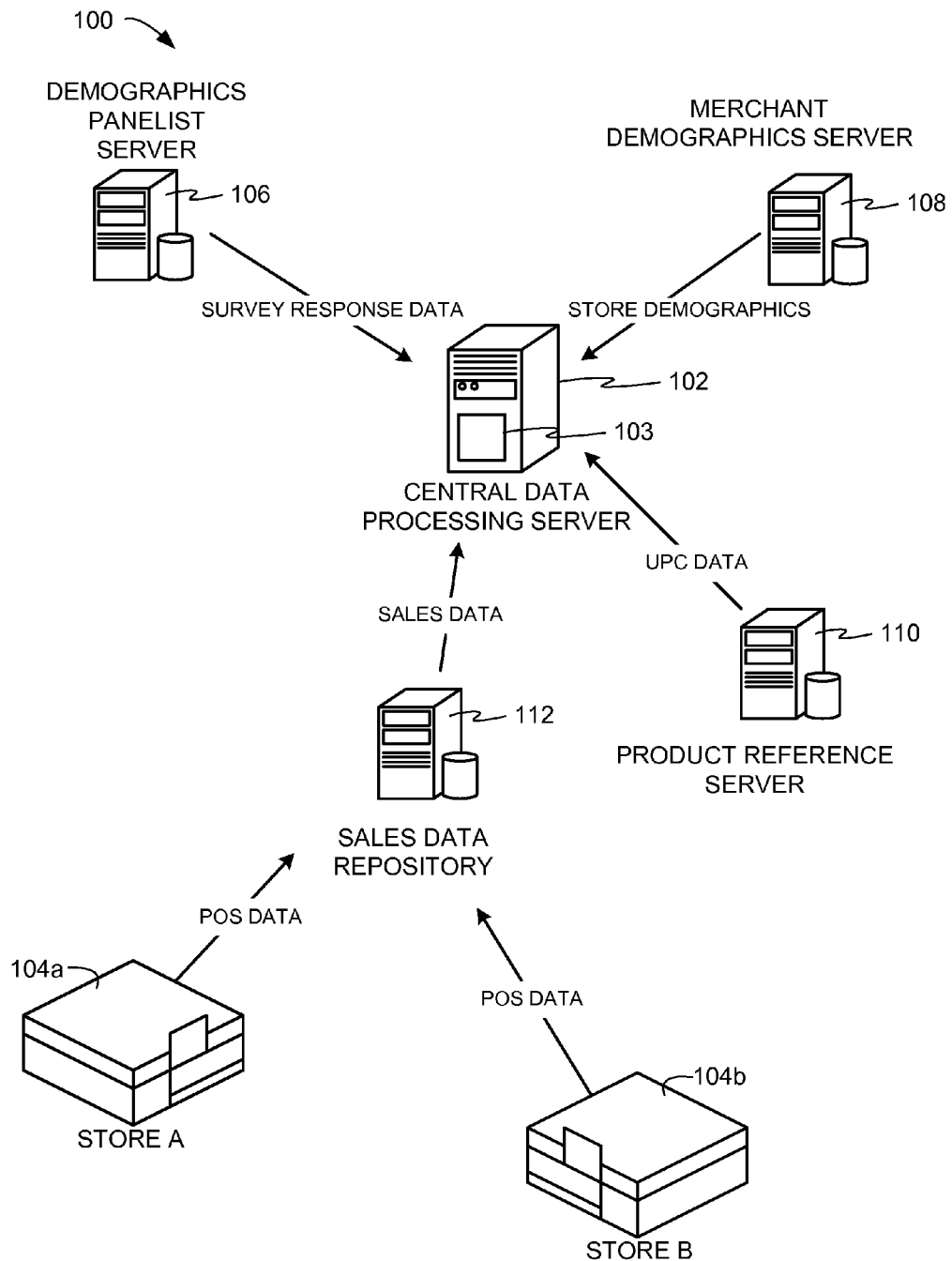
FIG. 1 depicts an example system configured to implement a syndicated sales analysis service for a plurality of retail establishments to analyze sales volumes information and causal factors related thereto using the example methods and apparatus described herein.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, or in any combination of hardware and software. Accordingly, while the following describes example methods and apparatus, persons having ordinary skill in the art will readily appreciate that the examples provided are not the only way to implement such methods and apparatus.

Example methods and apparatus to determine the effects of trade promotions on subsequent sales are disclosed. A disclosed example method includes determining a plurality of decremental effect factors, each corresponding to a respective one of a plurality of weeks, wherein at least some of the decremental effect factors are indicative of a downward trend in sales of a product that was under a promotion condition during a first one of the plurality of weeks. The example method also includes determining a plurality of decremental effect terms, each decremental effect term equal to the product of a corresponding coefficient multiplied by a corresponding one of the decremental effect factors, and determining a pantry loading effect term based on the plurality of decremental effect terms. Further, the example method includes determining a pantry loading incremental sub-volume based on the pantry loading effect term, and generating a report including the pantry loading incremental sub-volume.

A disclosed example apparatus includes a base driver data generator to calculate a plurality of decremental effect factors, each factor corresponding to a respective one of a plurality of weeks during a promotion condition, and a scoring processor to calculate a plurality of decremental effect terms by multiplying a factor coefficient by a corresponding one of the plurality of decremental effect factors, and to calculate a pantry loading effect term based on the plurality of decremental effect terms. The example apparatus also includes an incremental driver data generator to calculate a pantry loading incremental sub-volume based on the pantry loading effect term.

The example methods and apparatus described herein may be implemented by a consumer metering entity, by retail businesses, or by any other entity interested in collecting and/or analyzing the effects of different causal factors on the performance of product sales for retail entities. The example methods and apparatus may be used to help marketing professionals better understand consumers and how to reach and influence consumers that buy goods. Retailers and manufacturers are often interested in assessing the contributory effect of each factor on sales. One such assessment involves determining whether a future trade promotion and its terms will have an overly negative affect on future sales. Another assessment involves determining whether previously offered trade promotions were a significant cause of subsequently observed lower sales. For example, by analyzing different causal factors that could potentially influence product sales performance, the example methods and apparatus described herein can be used to determine whether those factors were or will be influential and the extent to which they affected or will likely affect product sales performance. Such information can help retail management to better understand the impact of different effects or factors on growth of sales volumes. In some cases, retail managers may be able to control the presence of such effects or factors to influence sales performance. In other instances, although the existence or presence of contributing effects or factors cannot be controlled, the extent to which such effects or factors are allowed to influence consumer purchases may be controlled. For example, knowing that a competing store's product promotion will take sales (e.g., share of the relevant market), a store may counteract by offering its own promotion.

Causal relationships between factors and effects could include the effect that running a trade promotion on a particular product during a particular point in time has on sales of that same product subsequent to the termination of the trade promotion. Such an analysis could be performed for the effects on sales within the same store that ran the promotion. Additionally, analyses could be performed for the effects that a promotion in one store had or will have on sales in other stores. While the example methods and apparatus can be used to analyze the effects on the same product for which a promotion was run, the methods and apparatus can more generally be used to determine the affect of a trade promotion on other products. For example, while a trade promotion on brand-A beverage may affect current and subsequent sales of that brand of beverage, the example methods and apparatus described herein can also be used to determine how such a promotion affects sales of beverages associated with other brands. That is, the methods and apparatus described herein can be used to analyze relationships between different products and analyze cross-brand or cross-product sales effects.

In a particular example, running a trade promotion on a product will result in consumers stocking up on that particular product during the promotion period. This pantry loading effect will influence sales of that product during subsequent weeks after the trade promotion has ended. However, the actual affect of pantry loading on subsequent sales is not readily apparent as there are numerous other factors that could also influence those subsequent sales. Such other factors could include competitor trade promotions, temporary or permanent price reductions for similar products, consumer affinity or loyalty to certain brands, consumers' perceived similarities between different brands, etc.

FIG. 1 depicts an example system 100 configured to implement a syndicated sales analysis service for a plurality of retail establishments to analyze sales volumes information and causal factors related thereto using the example methods and apparatus described herein. In the illustrated example, a central data processing server 102 receives and processes information associated with a plurality of retail establishments and an example promotion analysis engine 103 is configured to implement a syndicated service that can centralize the processing of information from different retail establishments of retail chains across a geographic region in a substantially similar manner. In this manner, the system 100 enables owners and/or operators of the retail chains to retrieve analysis results related to each of their retail establishments from one location (i.e., the central data processing server 102). Specifically, the central data processing server 102, via the example promotion analysis engine 103, receives information (e.g., household purchase data, store point-of-sale volume data, retail establishment demographic data, product universal product code data (UPC data), etc.) from a plurality of data sources and analyzes the information to generate sales volume data related to different retail establishments and/or wholesalers (hereinafter individually and collectively referred to as merchants), such as merchants 104a and 104b, to use in determining the extent to which different effects or factors contributed to past sales for those merchants. The sales volume data generated by the central data processing server 102 can also be used to help determine the extent to which different effects or factors may affect future sales.

To collect demographics data of at least some of the shoppers that shop with the merchants 104a and 104b or other monitored merchants, the central data processing server 102 is communicatively coupled to a demographics panelist server 106. An example demographics panelist server service includes, but is not limited to the Scantron® service and/or the Homescan® service, each provided by A.C. Nielsen. The example Homescan® server 106 is coupled to a plurality of Homescan® home units (not shown) provided at panel member homes. Each of the Homescan® home units is provided with a scanner interface to scan universal product codes (UPCs) of products purchased by household members during different shopping trips. In this manner, the Homescan® server 106 can collect specific purchase data describing the quantities and brands of products and/or services purchased in each household. In addition, the Homescan® server 106 sends surveys to household panel members via the panel members' Homescan® home units. The surveys are designed to collect demographic type information and other information describing shopping trips of the panel members. An example survey question may ask a panel member to identify, from a pre-populated list, all of the merchants that the panel member has visited within the past seven days and the days and times of day during which the shopping trips were made. The surveys may also request the panel members to provide the purpose of their shopping trips and how many people participated in the trip. In addition, the surveys may request the panel members to provide their gender and age. The Homescan® server 106 is configured to collect the survey responses from the different Homescan® home units and to collate and organize the survey data. In the illustrated example, the Homescan® server 106 is configured to communicate the survey response information to the central data processing server 102.

To receive demographics data related to respective monitored merchants, the central data processing server 102 is communicatively coupled to a merchant demographics server 108. The merchant demographics server 108 is provided with merchant demographics information describing respective monitored merchants and is configured to communicate the demographics information to the central data processing server 102. In the illustrated example, merchant demographic information includes demographic information about typical shoppers of corresponding merchants, sizes of merchant stores, merchant categories (e.g., supercenter store, supermarket store, discount store, drug store, etc.), percentages of consumers drawn from geographic zones surrounding each merchant store, etc.

To collect product reference data indicative of all products and/or services offered for sale by respective merchants, the central data processing server 102 is communicatively coupled to a product reference server 110. For each of the merchant stores 104a and 104b or other monitored merchant stores, the product reference server 110 is configured to store a UPC corresponding to each product and/or service offered for sale by that merchant. Each UPC is stored in association with the name of the product it represents including brand, unit size, and price. A UPC may be associated with several prices, each corresponding to a different offering time (e.g., a different week) at which the product's price was lower or higher than usual. For example, a week-long product promotion involving a reduced price will be reflected in a week-price data set stored in association with the UPC of that product.

To collect point-of-sale (POS) sales data indicative of all products and/or services sold in respective merchant stores, the central data processing server 102 is communicatively coupled to a sales data repository 112. In the illustrated example, the sales data repository 112 is communicatively coupled to the merchant stores 104a-b. The sales data repository 112 may further be communicatively coupled to any other monitored merchant stores to collect sales data therefrom. Each of the merchant stores 104a-b may store sales data in local servers (not shown) that are communicatively coupled to POS terminals at checkout counters used to perform sales transactions. In this manner, product/service sales data from all transaction logs can be communicated to the sales data repository 112 in an automated manner with minimal or no human interaction.

Figure 2:
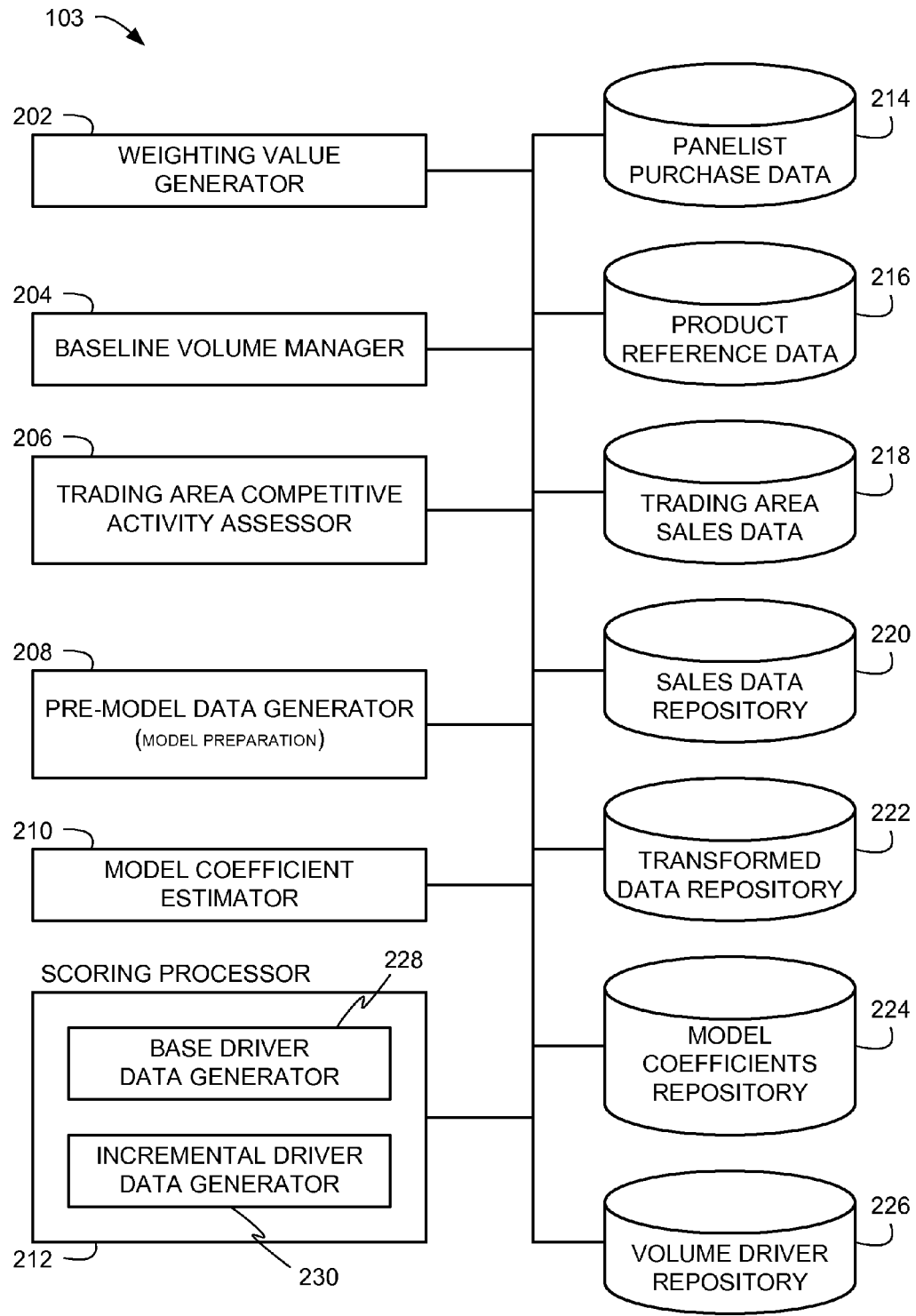
FIG. 2 is a block diagram of an example apparatus that can be used to analyze sales volumes information in connection with the example system of FIG. 1.

FIG. 2 is a block diagram of the example promotion analysis engine 103 that can be used to analyze sales volumes information in connection with the example system 100 of FIG. 1. In the illustrated example, the example promotion analysis engine 103 includes a weighting value generator 202, a baseline volume manager 204, a trading area competitive activity assessor 206, a pre-model data generator 208, a model coefficient estimator 210, a scoring processor 212, a panelist purchase data store 214, a product reference database 216, a trading area sales data store 218, a sales data repository 220, a transformed data repository 222, a model coefficients repository 224, and a volume driver repository 226.

The example promotion analysis engine 103 may be implemented using any desired combination of hardware, firmware, and/or software. For example, one or more integrated circuits, discrete semiconductor components, and/or passive electronic components may be used. Thus, for example, any of the weighting value generator 202, the baseline volume manager 204, the trading area competitive activity assessor 206, the pre-model data generator 208, the model coefficient estimator 210, the scoring processor 212, the panelist purchase data store 214, the product reference database 216, the trading area sales data store 218, the sales data repository 220, the transformed data repository 222, the model coefficients repository 224, and/or the volume driver repository 226, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 16:
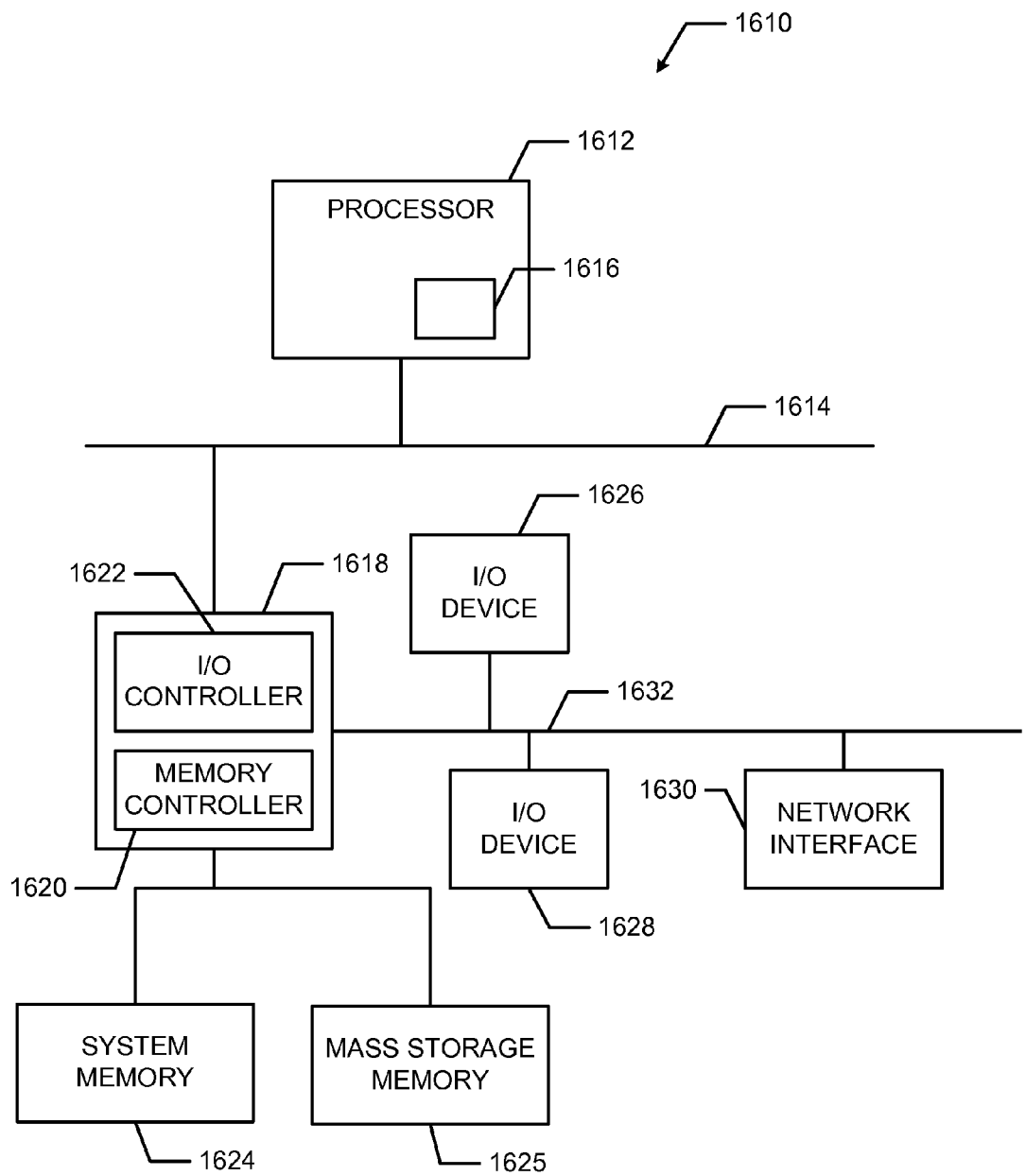
FIG. 16 is a block diagram of an example processor system that may be used to implement some or all of the example methods and apparatus described herein.

Some or all of the weighting value generator 202, the baseline volume manager 204, the trading area competitive activity assessor 206, the pre-model data generator 208, the model coefficient estimator 210, the scoring processor 212, the panelist purchase data store 214, the product reference database 216, the trading area sales data store 218, the sales data repository 220, the transformed data repository 222, the model coefficients repository 224, and/or the volume driver repository 226, or parts thereof, may be implemented using instructions, code, and/or other software and/or firmware, etc. stored on a machine accessible or readable medium and executable by, for example, a processor system (e.g., the example processor system 1610 of FIG. 16). When any of the appended claims are read to cover a purely software and/or firmware implementation, at least one of the weighting value generator 202, the baseline volume manager 204, the trading area competitive activity assessor 206, the pre-model data generator 208, the model coefficient estimator 210, the scoring processor 212, the panelist purchase data store 214, the product reference database 216, the trading area sales data store 218, the sales data repository 220, the transformed data repository 222, the model coefficients repository 224, and/or the volume driver repository 226 is hereby expressly defined to include a tangible medium such as a memory, DVD, CD, etc. storing the software and/or firmware.

Turning in detail to FIG. 2, the weighting value generator 202 is configured to generate weighting values and/or a weighting similarity index value (hereinafter referred to as a weighting similarity index) for product pairs to indicate the similarities or diversities between different products based on particular criteria. For example, a weighting index value between brand A soda and brand B soda (i.e., an A:B weighting index) based on price will indicate the consumer-perceived similarity between the brands and the propensity of consumers to purchase either product based on price differences. In this instance, a weighting similarity index closer to one may indicate that consumers consider the two soda brands as closely comparable to one another such that price (as opposed to taste or brand loyalty) may be the most significant factor contributing to purchasing brand A over brand B. In the example implementations described herein, the weighting value generator 202 is implemented using Jaccard index values or Jaccard similarity coefficients, which are values based on the size of an intersection of product characteristics divided by the size of the union of sample sets. However, other weighting techniques may additionally or alternatively be used to generate weighting similarity index values to represent similarities or differences between different products.

Generally speaking, the example promotion analysis engine 103 of FIG. 2 collects transaction data related to panelist purchase data and identifies pairings of target product(s) of interest and one or more competitive products) that are deemed to be competitively related to the target product(s). One or more criteria and/or thresholds may be employed to calculate which competitive products should be paired with the target products) of interest based on, for example, similarity in price, similarity in features, similarity in one or more categorical product types, and/or the frequency at which a panelist purchases the competitive product instead of the target product(s). To minimize and/or eliminate bias effects that typically occur when an analyst attempts to select one or more competitive products to compare against the target products) of interest, the example promotion analysis engine 103 of FIG. 2 saves the list of calculated competitive products for subsequent analysis. As discussed in further detail below, employing such a calculated list operates as a model to effectively restrict the user's scope of competitive products used during analysis of target products) of interest being promoted.

Additionally, the example promotion analysis engine 103 of FIG. 2 calculates, retrieves, and/or receives a baseline volume of sales, which refers to the volume of sales that would occur absent promotions of the target product of interest. One or more working variables are calculated and input into a regression model, and additional data related to the merchants by which the target and competitive products are sold is acquired by the example promotion analysis engine 103. One or more model coefficients are calculated before the example promotion analysis engine 103 of FIG. 2 facilitates a calculation of the volume sales for a target product in view of a promotion. Further, the example promotion analysis engine 103 facilitates a calculation of the volume sales in competitive stores that result from the promotion in a target store. Without limitation, the example promotion analysis engine 103 of FIG. 2 facilitates a calculation of expected sales volumes in response to consumer pantry loading after a promotion on the target product has run.

In the example implementations described herein, the weighting similarity index values are used to determine inter-brand weighting values and intra-brand weighting values. Inter-brand weighting values are used to quantify the similarities or differences between products of different brands as in the example above involving brand A soda and brand B soda. Intra-brand weighting values are used to quantify the similarities and differences between products within the same brand such as brand A cola and brand A root beer. In this manner, inter-brand weighting values can be used to quantify the effects of market erosion on competitor products in which sales of a target product under analysis are lost to competitor products due to one or more factors including, for example, consumer taste preference, price, promotion, brand loyalty, etc. Intra-brand weighting values can be used to quantify the effects of cannibalization within the same brand. Cannibalization occurs when a company offers a new product or service that takes sales or market share from one or more of its already existing products or services. Cannibalization may be due to one or more factors including, for example, consumer taste preference, price, promotion, novelty, etc.

Figure 3:
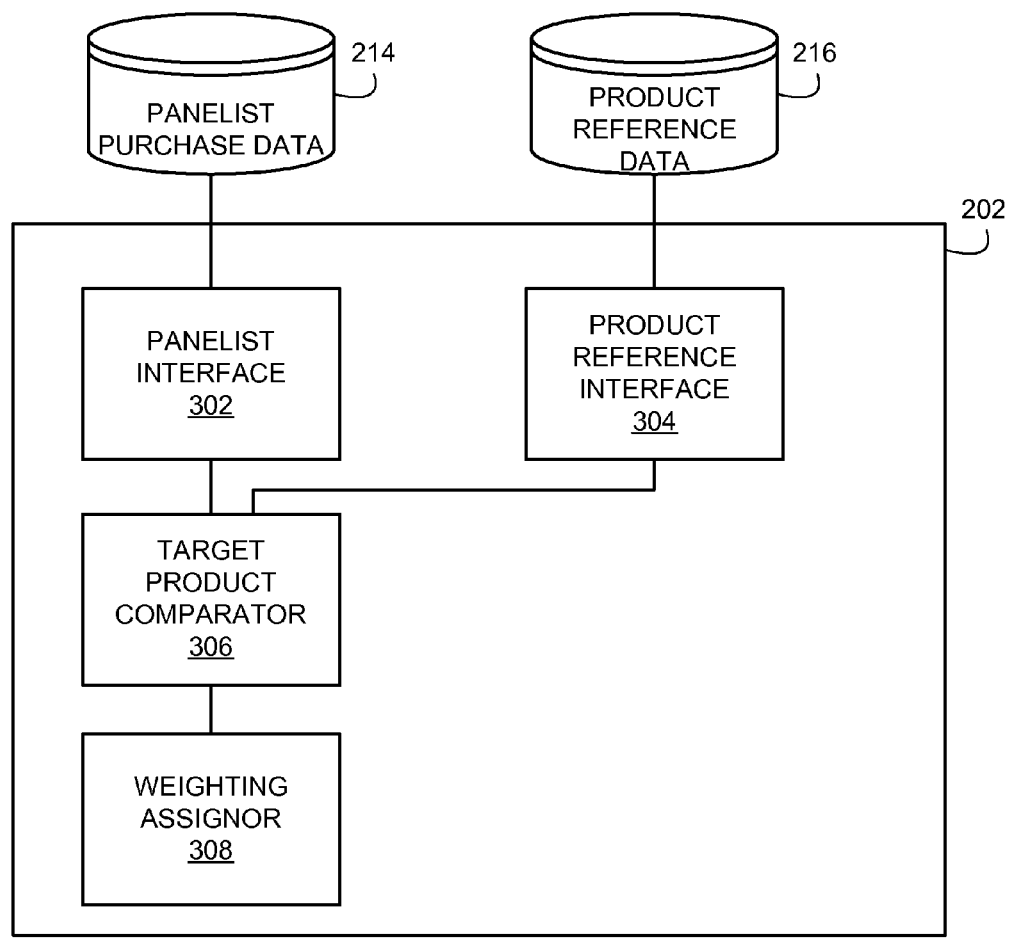
FIG. 3 is a block diagram of an example apparatus that can be used to generate weighting values in connection with the example system of FIGS. 1 and 2.

Turning briefly to FIG. 3, the example weighting value generator 202 is shown in greater detail. In the illustrated example of FIG. 3, the weighting value generator 202 includes a panelist interface 302 to communicatively connect with the panelist purchase data store 214, and a product reference interface 304 to communicatively connect with the product reference database 216. Based on an identified target product of interest, an example target product comparator 306 identifies one or more competitive product candidates via the product reference interface 304 that are within a similar product category (e.g., carbonated beverages, snack foods, cold breakfast cereals, etc.). Additionally or alternatively, the example target product comparator 306 may further narrow any resulting list of competitive product candidates down by applying one or more sub-category constraints on the candidate list. For example, a general category of carbonated beverages may further contain soda sub-categories of cola, citrus, and fruit. Similarly, a general category of cold breakfast cereals may further contain cereal sub-categories of health-cereals, sugared-cereals, and children's cereals.

The example target product comparator 306 also refers to the panelist interface 302 to determine which identified competitive product candidates were purchased by panelists at or near a selected time-period as the target product of interest. One or more thresholds may be employed by the example target product comparator 306 to determine which competitive product candidates should be added to a working list of competitive products that correspond to the target product of interest. For example, if the target product of interest is Coke®, which is included in the general category of soda and the sub-category of cola, then the example target product comparator 306 searches the panelist data store to determine how many instances occurred in which a consumer purchased Coke® on one occasion, but also purchased a competing cola brand instead of Coke® on one or more alternate occasions. In this example, if the consumer is found to have purchased Pepsi® on a substantially greater number of occasions, but only purchased RC Cola® on relatively infrequent occasions, then Pepsi® may be deemed to be an appropriate competitive product to Coke® for purposes of competitive analysis.

The example target product comparator 306 is also coupled to a weighting assignor 308 to apply a similarity calculation (weighting similarity index value) to each pair of identified target product and competitive product. As described above, the Jaccard index may be employed by the weighting assignor 308 for each pair to yield a unitless numerical identifier (weighting similarity index value) indicative of the similarity between products (e.g., inter-brand weighting values or intra-brand weighting values). The assigned weight associated with the Jaccard index represents the inter-brand weighting value $\beta_{Inter(i,k)}$, where the variable i represents the target product of interest and variable k represents a competitive product. Similarly, a Jaccard index may be calculated for different UPCs by the same manufacturer to represent potential effects of cannibalization. The assigned weight associated with the Jaccard index in view of two products of the same brand represents the intra-brand weighting value $\beta_{Intra(i,k)}$, where variable i represents the target product of interest and variable k represents another product by that same manufacturer.

Returning to FIG. 2, the baseline volume manager 204 is also configured to generate, calculate, retrieve, and/or otherwise receive baseline volumes for different target products under analysis. A baseline volume is indicative of the normal expected sales volume for a product absent any trade promotion for that product. Trade promotions can include feature advertisements (e.g., coupons or advertisements in newspapers, magazines, etc.), in-store displays (e.g., in-store posters, shelf talkers, coupon dispensers), or price reductions. In the presence of trade promotions, promoted products typically undergo an increase in sales. To determine the effects of a promotion on the increased sales for a particular product, a baseline volume can be used to determine what the normal sales volume for that product would have been absent the promotion and determining the difference in volume (known as the incremental volume) observed between the baseline volume and the actual sales volume during the promotion period. This difference in volume or incremental volume is the volume attributable to the effects of the trade promotion. Different techniques are available for determining baseline volumes. On such known technique is the Box-Jenkins time series calculation. In the example implementations described herein, baseline volumes are based on a store-week-UPC level, meaning that a baseline volume represents the sales in a particular store, during a particular week, of a particular product identified by its unique UPC.

The illustrated example trading area competitive activity assessor 206 of FIG. 2 is configured to receive census blocks for each merchant (e.g., retailer, wholesaler, and/or other business entity, and hereinafter generally referred to as "retailers"). A census block is a delineated portion of purchasers that spend money with the retailer and may be defined based on geographic proximity to the retailer. For example, a single retailer may include four census blocks that each contain an equal number of shoppers located to the North, South, East, and West of the retailer. Additionally, each census block is typically associated with a percentage value to represent how much each block purchases (e.g., the North census block accounts for 35% of the retailer's weekly sales, while the South and East account for 25%, and the West accounts for only 15% of the retailer's weekly sales).

Each census block typically includes shoppers that shop with more than one merchant. Thus each census block includes some amount of overlap with one or more other merchants. Overlap of the census blocks may also produce an effect of greater or lesser sales at a first merchant based on promotions run by a second merchant. For instance, if the second merchant runs a promotion for sales of Coke® 12-ounce cans, then a corresponding effect of lesser sales of Coke® of the first merchant (that has a common census block) may occur. As described in further detail below, the example trading area competitive activity assessor 206 acquires merchant data from the trading area sales data store 218 to facilitate one or more volume calculations at competitive stores of a product in response to a promotion of that sold product of interest.

The illustrated example of FIG. 2 also includes a pre-model data generator 208 to generate variables to be used in a model prior to being used in one or more scoring algorithms that ultimately yield volume estimates as a result of target product promotional activity. As discussed in further detail below, the example pre-model data generator 208 of FIG. 2 uses point-of-sale (POS) input data, calculated competitive product pairing data, panelist data, and trading area data to calculate an estimated volume of products sold in response to one or more causal factors. Causal factors may include, but are not limited to, a temporary price reduction (TPR), a feature (e.g., flyers describing the target product), a display (e.g., an in-store display of the target product, such as at the end of an aisle), and/or a combination of a feature and a display.

The example pre-model data generator 208 also minimizes and/or eliminates data anomalies due to seasonality effects. For example, in the event that the sale of chocolates is particularly high during the months of December and February (e.g., Christmas holiday and Valentines Day), corresponding sales peaks of such products may occur absent a promotion. As such, the example pre-model data generator 208 calculates a dimensionless index to minimize such expected peaks of chocolate sales so that corresponding volume data calculations are not artificially high.

The example pre-model data generator 208 also calculates equivalent volumes and base equivalent volumes for products to eliminate, for example, product packaging disparities. Such disparities occur when a product manufacturer sells products with varying pre-packaged quantities, which may prevent direct comparisons between the same brands on a per-unit sale basis. For example, Coke® sells 12-ounce cans of cola as well as 2-liter bottles of cola. On a per-unit sale of a 6-pack UPC and a 2-liter UPC sale, direct comparison is not representative of a true measure of the ultimate amount of cola sold (i.e., a 2-liter bottle is approximately 68 ounces). As such, the pre-model data generator 208 converts one or more target products of interest into a corresponding equivalent volume unit to, in effect, implement a common base-comparison unit for all brand package configurations. In the illustrated example above, a common base-comparison unit for Coke® cola products (whether such products are sold in cans or bottles) is units of ounces.

One or more competitive effects variables are also calculated by the example pre-model data generator 208. Generally speaking, there are three actions that a competitor can take to affect sales of the target product. In particular, the competitor can increase or decrease the amount of trade promotion activity, the competitor can change their regular price, and/or the competitor can put new UPCs (i.e., new or additional products) on store shelves. Increasing or decreasing the amount of trade promotion activity may include running features, displays, temporary price reductions, and/or any combination thereof. The pre-model data generator 208 calculates a competitive trade index, such as an example Jaccard weighted category index, as a measure of the weighted aggregate level of trade promotion activity present in the competitive brands relative to the target brand of interest. The competitive trade index allows a determination/estimation of the degree to which another trade promotion may be affecting the sales of the target product (inter-brand trading index), as well as the degree to which the trade promotion of the target product may be affecting the sales of competitive products. In the event that the target product trade promotion affects sales of its own products, the example pre-model data generator 208 also calculates a brand-trade index (intra-brand trading index) to identify cannibalization effects.

The second action that a competitor may take that affects sales of the target product of interest is to change the product regular price. Generally, if a competitor lowers a shelf price of the competitive product, a corresponding decrease in sales is expected of the target product of interest. As such, the example pre-model data generator 208 examines the aggregated price changes in items/products that are considered to be competitive, weights such changes based on trade weights (e.g., a Jaccard weight) and creates an inter-brand price weight and/or an intra-brand price weight to represent a measure and/or a magnitude of the degree to which competitors take price action from the target product of interest.

The third action that a competitor may take that affects sales of the target product of interest is to place new UPCs on retail shelves. Generally, as the competitor increases the number of items in distribution, a corresponding negative affect on sales volumes of the target product is expected. As such, the example pre-model data generator 208 calculates inter-brand and intra-brand weighted distribution factors to represent the effects on sales in response to new product UPCs (i.e., both competitive UPCs and UPCs introduced by the same manufacturer as the target product of interest).

In view of the fact that statistical analysis techniques may include the phenomenon in which there are multiple sources of randomness in the data, the example pre-model data generator 208 minimizes and/or eliminates such effects. Sources of variation include cross-sectional variants and randomness that occur over time. Removal of cross-store effect from a model may be further accomplished by, for example, a mean-centering process executed by the pre-model data generator 208. Mean centering prevents potential bias and/or nuisance variants in the data.

While calculation of one or more corresponding effects on product sales volumes may be conducted in view of a current week for a particular store, the methods and apparatus described herein also examine cross-store promotional effects. In particular, to further examine cross-store promotional effects and/or to numerically describe a store pattern of sales, the example pre-model data generator 208 prepares one or more interaction variables related to store categories (e.g., store interaction variables). Store categories typically exhibit characteristic patterns due to, in part, varying degrees of homogeneity with similar stores. For example, store characteristics related to a percent of Hispanic shoppers, African-American shoppers, and/or stores within certain latitudes/longitudes (e.g., particularly poor neighborhoods, particularly affluent neighborhoods, etc.) may have corresponding sales expectations that are statistically relevant and assist the process of projecting sales volume estimations. As discussed in further detail below, the example pre-model data generator 208 incorporates such store characteristics when calculating effects due to promotional activity.

Estimations derived from a model-based approach typically differ from estimations derived from an algorithm-based approach. As such, the example pre-model data generator 208 also calibrates regression-based incremental volume estimates for trade effects in a manner that aligns with estimates derived from an algorithmic baseline approach. As described above, the baseline is an estimate of sales in the absence of a feature, a display, or a price cut. Any difference between the baseline and the total unit sales is referred to as an incremental volume, which is attributed to the presence of causal factors of a corresponding feature, display, or price cut. However, similar estimates via the model-based approach introduce differences that are calibrated by the example pre-model data generator 208 by calculating a correction factor, as discussed in further detail below.

The model coefficient estimator 210 is configured to generate coefficient values that may be used in one or more scoring algorithms to estimate one or more of volumetric sales effects of products in view of causal factors (e.g., promotional activity) in a target store, volumetric sales effects of products at competitor stores in view of such causal factors, and volumetric sales effects of products in view of consumer pantry loading behavior. Some modeling techniques view the target products and competitive products as nested within one store and/or multiple competitive stores. Additionally, the one or more competitive stores are further nested within geographic localities, which reside within delineated marketing target areas. In the illustrated example of FIG. 2, the model coefficient estimator 210 employs a hierarchical linear modeling (HLM) technique. However, any other modeling technique may be used including, but not limited to, linear regression and/or multiple linear regression techniques.

The coefficient values generated by the example model coefficient estimator 210 of FIG. 2 include fixed effects and random effects to allow an example base driver data generator 228 to calculate net store-UPC coefficients, as described in further detail below. Generally speaking, the example model coefficient estimator 210 of FIG. 2 initially sets all coefficients to zero unless and until the received data includes enough weighted evidence to justify an alternate value. Such evidence may be revealed via the aforementioned HLM and/or regression technique(s).

The example scoring processor 212 of FIG. 2 is configured to employ one or more scoring algorithms that utilize one or more variables prepared by the example pre-model data generator 208 and one or more model coefficients from the example model coefficient estimator 210. As discussed in further detail below, the example base driver data generator 228 of the scoring processor 212 calculates, in part, a volume due to intra-brand and inter-brand pricing, intra-brand and inter-brand distribution, volumes due to pantry loading, and volumes due to intra-brand and inter-brand trading. Additionally, an example incremental driver data generator 230 of the scoring processor 212 calculates, in part, raw driver volumes that are specific to one or more causal types. Causal types include, but are not limited to, corresponding volumes based on a price-cut, a feature, a display, and/or one or more combinations thereof.

FIGS. 4 to 15B are flow diagrams representative of machine readable and executable instructions or processes that can be executed to implement the example promotion analysis engine 103 of FIG. 2. The example processes of FIGS. 4 to 15B may be performed using a processor, a controller and/or any other suitable processing device. For example, the example processes of FIGS. 4 to 15B may be implemented in coded instructions stored on a tangible medium such as a flash memory, a read-only memory (ROM) and/or random-access memory (RAM) associated with a processor (e.g., the processor 1612 of FIG. 16). Alternatively, some or all of the example processes of FIGS. 4 to 15B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations of the example processes of FIGS. 4 to 15B may be implemented manually or as any combination(s) of any of the foregoing techniques, for example, any combination of firmware, software, discrete logic and/or hardware. Further, although the example processes of FIGS. 4 to 15B are described with reference to the flow diagrams of FIGS. 4 to 15B, other methods of implementing the processes of FIGS. 4 to 15B may be employed. For example, the order of execution of the blocks may be changed, and/or some of the blocks described may be changed, eliminated, sub-divided, or combined. Additionally, any or all of the example processes of FIGS. 4 to 15B may be performed sequentially and/or in parallel by, for example, separate processing threads, processors, devices, discrete logic, circuits, etc.

Figure 4:
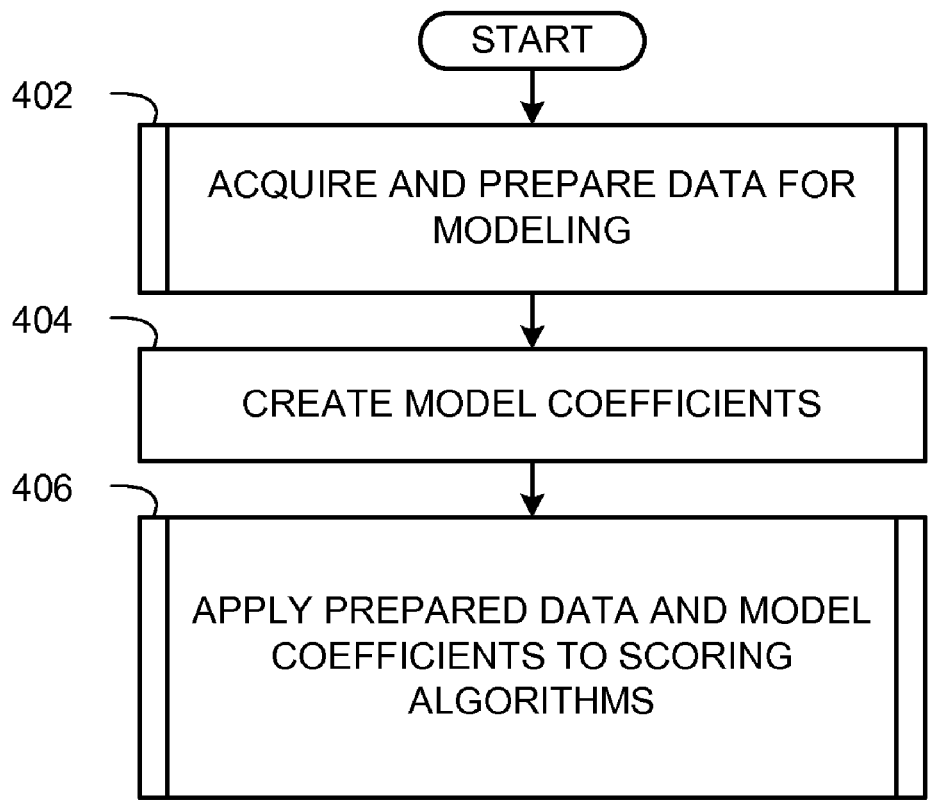
FIG. 4 is a flow diagram representative of machine readable instructions that may be executed to analyze sales volumes information and causal factors related thereto for retail establishments under analyses in connection with the example system of FIG. 1.

Turning to FIG. 4, initially, the example promotion analysis engine 103 of FIG. 2 acquires sales data of products from multiple sources (block 402). In the illustrated example of FIG. 4, point-of-sale (POS) data is retrieved, which is indicative of sales for product UPCs, merchant location(s) in which the product(s) were sold, sale dates, and/or volumes for each UPC sold in a given week. Retailers and/or merchants may include traditional channels, such as grocery stores, community hardware stores, and/or convenience stores, but specialty channels may further include discount stores, specialty food stores, large-scale hardware stores, and/or office supply stores. Additionally, the retrieved POS data includes information related to an amount of money paid for the item(s) and whether the item(s) were associated with, or the subject of a promotion. Promotion information may include, but is not limited to, a feature (e.g., a flyer, coupon, advertisement), a display (e.g., an in-store display), and a location and/or size of the display (e.g., end of aisle, large placard, etc.).

The POS data may be collected, sold, and/or otherwise distributed by any third-party responsible for data acquisition, such as ACNielsen®. For example, ACNielsen® has long compiled data via its Scantrack® system. With the Scantrack® system, merchants install equipment at the POS that records the UPC of every sold product(s), the quantity sold, the sale price(s), and the date(s) on which the sale(s) occurred. The POS data collected at the one or more stores is periodically exported to ACNielsen® where it is compiled into one or more databases, such as the example sales data repository 220 of FIG. 2. Additionally, ACNielsen® employs a Homescan® system, which is a panelist-based system to measure consumer behavior and identify sales trends. With the Homescan® system, households are selected to be statistically representative of one or more demographic components of the population to be measured. The panelists of these selected households are provided with home and/or mobile scanning equipment and agree to use that equipment to identify, and/or otherwise scan the UPC of every product that they purchase and to note the identity of the retailer or wholesaler (collectively or individually referred to as "merchant") from which the corresponding purchase was made. The data collected via this scanning process is periodically exported to ACNielsen®, where it is compiled into one or more databases, such as the example panelist purchase data store 214 of FIG. 2.

In the illustrated example of FIG. 4, acquired sales data (block 402) also includes trading area merchant data. Each merchant store includes characteristic data related to its size, number of employees, all commodity volume (ACV) sales, location, and/or one or more census blocks that surround the merchant. ACNielsen® also categorizes such merchants (e.g., retailers and/or wholesalers) and/or compiles data related to the store characteristics via its TDLinx® system. In the TDLinx® system, data is tracked and stored that is related to, in part, a merchant store parent company, the parent company marketing group(s), the number of stores in operation, the number of employee(s) per store, the geographic address and/or phone number of the store(s), and/or the channel(s) serviced by the store(s). Data indicative of the merchant store(s) may be stored in the example trading area sales data store 218 of FIG. 2.

Returning to FIG. 4, model coefficients are created (block 404) in a manner consistent with the modeling technique(s) selected by one or more analysts. As described above, the selected modeling technique(s) may include, but are not limited to linear regression, multiple linear regression, and/or hierarchical linear modeling to set one or more coefficient values. After setting the one or more coefficient values, such as the fixed-effect coefficients and/or the random-effect coefficients to a non-default zero value (block 404), the example promotion analysis engine 103 applies such coefficients, acquired data, and prepared variables to one or more scoring algorithms (block 406), as described in further detail below.

Figure 5:
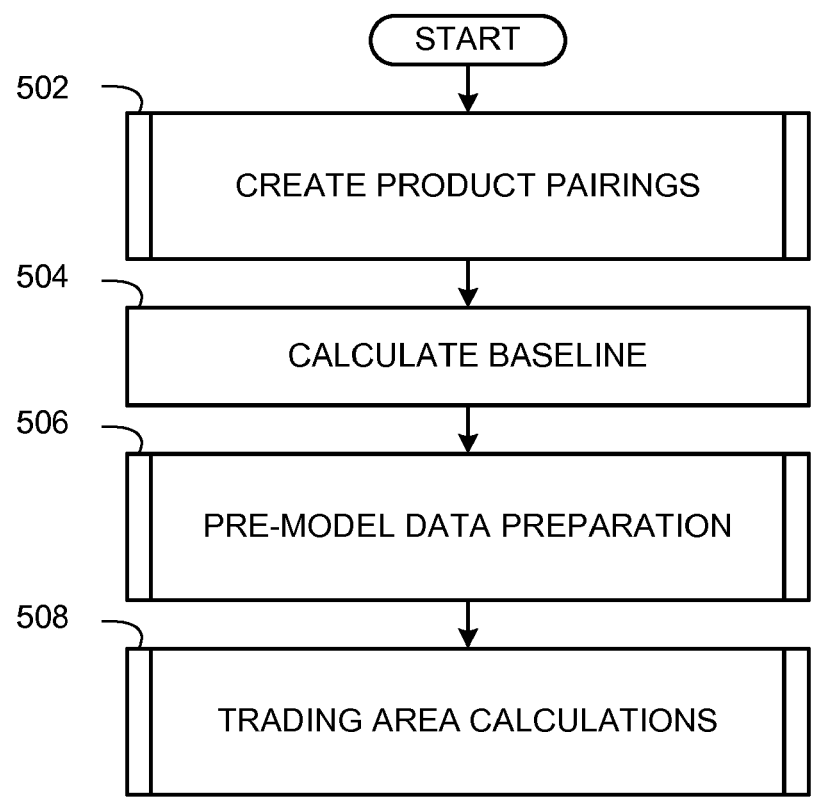
FIG. 5 illustrates a flow diagram representative of machine readable instructions that may be executed to acquire and prepare data for modeling in connection with the flow diagram of FIG. 4.

FIG. 5 is a flowchart representative of example machine readable instructions that may be executed to acquire and prepare data for modeling at block 402 of FIG. 4. At block 502, the example weighting value generator 202 creates one or more pairings of competitive products for each target product of interest. From each product pairing created, the example weighting value generator 202 calculates a weighting similarity index value, which may be represented as a unitless numerical value to indicate a degree of similarity between the target product of interest and the competitive product. In the illustrated examples described herein, the calculated weighting similarity index value is implemented via the Jaccard similarity methodology, but other weighting techniques may additionally or alternatively be used to generate the weighting similarity index values.

To allow an understanding of how causal factors, such as promotional prices (e.g., price reductions), displays, and/or features affect sales volumes, the example baseline volume manager 204 calculates a baseline volume sales estimate (block 504) that results in the absence of any promotional activity. The difference between the calculated baseline volume (block 504) and product(s) sold in excess of that baseline are referred to as incremental sales. Acquired data and product pairs are further used by the example pre-model data generator 208 to, in part, generate working variables (block 506) to facilitate base-driver and incremental-driver scoring calculations. Additionally, the example trading area competitive activity assessor 206 includes trading-area data to identify one or more census blocks for each merchant (block 508). In the illustrated example of FIG. 5, trading area data is retrieved from Spectra® and/or TDLinx® services, but any other trading area data services may also be used.

Figure 6:
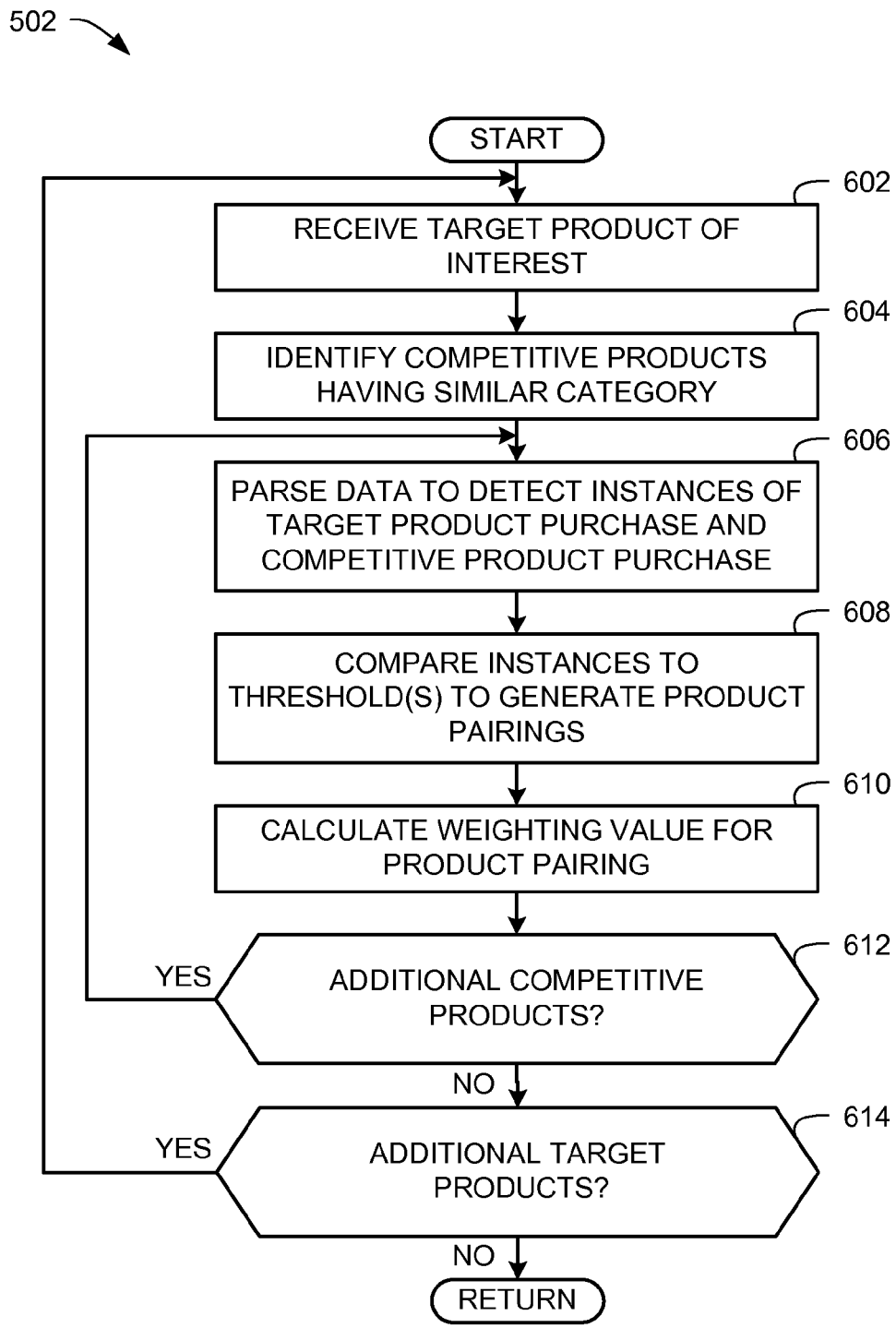
FIG. 6 illustrates a flow diagram representative of machine readable instructions that may be executed to create product pairings in connection with the flow diagram of FIG. 5.

FIG. 6 is a flowchart representative of example machine readable instructions that may be executed to create product pairings between a target product of interest and one or more competitive products at block 502 of FIG. 5. At block 602, the example weighting value generator 202 receives a target product of interest. The target product of interest includes a corresponding universal product code (UPC) that, when referenced against the product reference database 216, reveals one or more specific characteristics related to the target product of interest. The example product reference database 216 of FIG. 2 may be implemented as a third-party global database in which manufacturers purchase the rights to exclusively print and use a unique UPC indicia. Additionally or alternatively, product reference information is also maintained by ACNielsen® as a Product Reference Library (PRL) that codes more than 700,000 items, in which each item includes an average of forty (40) descriptive product characteristics. The characteristics for each item may include, but are not limited to, manufacturer name, product size, brand, flavor, lot number, serial number, package type, and/or nutritional information.

As described above in connection with of FIG. 3, the example product reference interface 304 of the weighting value generator 202 searches the product reference data store 216, such as the ACNielsen® PRL, for candidate competitive product(s) that may have one or more characteristic degrees of similarity to the target product of interest (block 604). For example, if the target product of interest is a brand of soda, the product reference interface 304 queries the product reference data store 216 for all UPCs having a general category identifier of soda and adds such category matches to a candidate list. The product reference interface 304 may further constrain competitive UPC/product candidates in the list to one or more sub-categories of the target product, such as a sub-category of cola, a sub-category of 6-packs, and/or a sub-category of 12-ounce bottle 6-packs (e.g., as opposed to 12-ounce can 6-packs).

The example panelist interface 302 of the weighting value generator 202 further queries the panelist purchase data store 214 for instances of the target product purchase and one or more purchases of a competitive product from the candidate list (block 606). While the resulting candidate list may be very large depending on the product type(s), the example target product comparator 306 of the weighting value generator 202 further constrains the candidate list by comparing matching purchase instances against one or more threshold(s) (block 608). For example, if the target product of interest is a Coke® 2-liter bottle, the product reference interface 304 may have generated a candidate competitive product list that includes any number of competitive 2-liter soda manufacturers. However, the example panelist interface 302 facilitates a method by which that candidate list may be reduced to a manageable size by identifying instances when such competitive products were actually purchased by consumers. In effect, only competitive products that actually sell will be retrieved by the panelist interface 302 for a given period of time, while other less popular soda brands that are deemed relatively obscure will not be considered.

Thresholds employed by the example target product comparator 306 may include, but are not limited to, a maximum percent occurrence within a two-week time span. For example, the target product comparator 306 may reduce the competitive product candidate list and retain only competitive products that were most frequently purchased by the consumer within a two-week time-span of purchasing the target product of interest. Employing such threshold test(s) may reveal, for example, that a consumer that purchases a 2-liter bottle of Coke® in week 1 is also observed to frequently purchase a 2-liter bottle of Pepsi®, but is rarely observed to also purchase a 2-liter bottle of orange Crush® instead of the Coke® purchase. As such, a more relevant list of competitive products may be realized and used for trend analysis.

For each of the pairs (i.e., the target product of interest paired with one of the competitive products), the example weighting assignor 308 calculates a corresponding weighting similarity value/index (block 610). For example, a Jaccard weighting index calculated by the weighting assignor 308 may determine that Coke® and Pepsi® have a weighted index of 0.90, which indicates a relatively significant similarity between the two. On the other hand, the weighting assignor 308 may determine via the Jaccard weighting methodology that Coke® and orange Crush® have a weighted index of 0.45, which indicates a much lower relative similarity between those two products. In operation, the example target product comparator 306 may further employ one or more thresholds to retain only those weighting similarity index values meeting such threshold parameter(s) and/or matching a target index value. The one or more thresholds allow a competitive product subset to be created, in which the products within the subset exhibit similar weighting similarity index values and/or weighting similarity index values that meet one or more target values and/or threshold values.

Each target product of interest may have any number of candidate competitive products from the candidate list. Thus, if there are additional competitive products to analyze (block 612), then control passes to block 606. Additionally, if there are more target products of interest for which corresponding weights are to be calculated (block 614), the example weighting value generator 202 may repeat the example flowchart of FIG. 5 beginning at block 602.

Figure 7A:
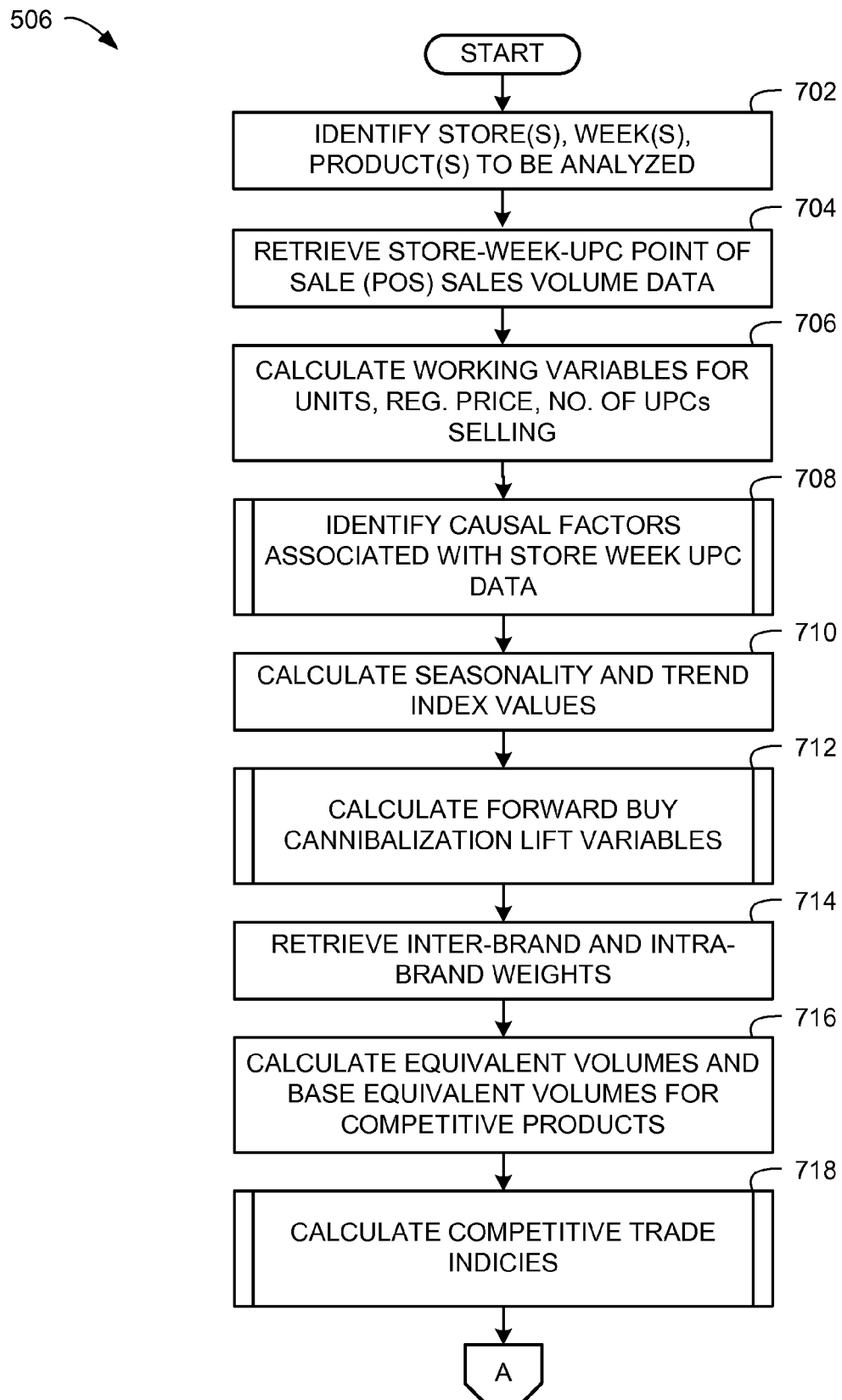
FIGS. 7A and 7B illustrate a flow diagram representative of machine readable instructions that may be executed to prepare data for modeling in connection with the flow diagram of FIG. 5.
Figure 7B:
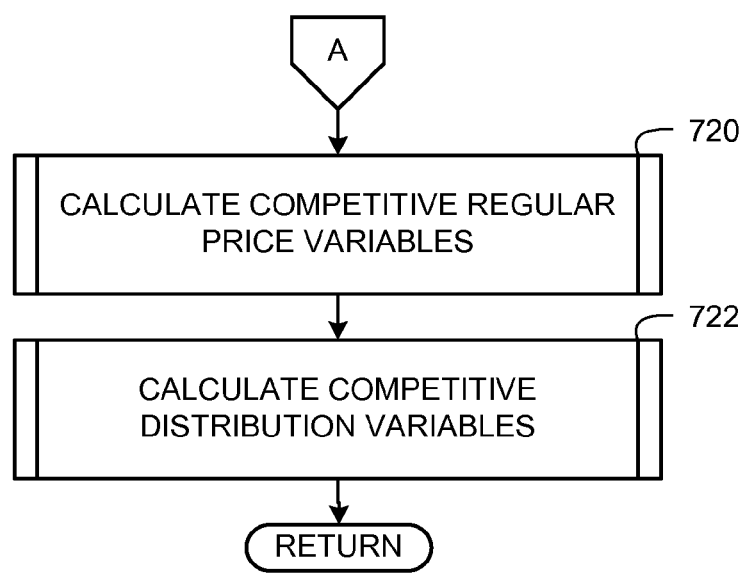

FIGS. 7A and 7B are representative of example machine readable instructions that may be executed to prepare pre-model data at block 506 of FIG. 5. At block 702, the example pre-model data generator 208 identifies at least one store, week, and/or product to be analyzed (store-week-UPC). One or more unique stores of interest may be identified by a store record key, and each week of interest may be identified by a record key indicative of any seven day span of store data. As such, the example pre-model data generator 208 may identify one or more store-week-UPC data sets for which to calculate working variables that facilitate further volume calculations. While the illustrated examples described herein include a lowest level of time detail from each store as a week in duration, any other duration of interest may also be applied to the methods and apparatus described herein. Additionally or alternatively, the pre-model data generator 208 may identify a product-centric week-UPC to analyze volume effects of product trade promotions on other products.

The pre-model data generator 208 retrieves one of the store-week-UPC POS sales volume data sets (block 704) from one or more of the panelist purchase data store 214, the product reference data store 216, and the sales data repository 220. In some example implementations, the sales volume may correspond to the sales of a product sold in one packaging size (e.g., two-liter soda), in which case the sales volume data is retrieved based on only one unique UPC. In other instances, the sales volume may correspond to the sales of a product sold in two or more packaging sizes (e.g., two-liter bottle, 12-ounce cans, 6-ounce cans, 24-ounce bottles), in which case the sales volume data is retrieved based on two or more unique UPCs. In either case, the sales volume analyses described herein can be performed using base equivalent units by representing the sales volumes using common, standard volumetric units (or piece-count units). For example, if a soda product is sold in different packaging sizes, the sales volume analyses can convert the POS sales volume data for each packaging type into ounces such that a sale of a two-liter bottle represents a sale of sixty-eight ounces of soda based on a base-equivalent measure, while a sale of a six-pack of twelve-ounce cans represents a sale of seventy-two ounces of soda based on the same base-equivalent measure.

A dependent variable of the sales volume for each product is calculated as the log of the number of units sold, and independent variables of the log of the regular price and number of UPCs selling are calculated for future use (block 706). Causal factors associated with the store-week-UPC data are identified (block 708), which may include temporary price reductions (TPRs), features (e.g., flyers), displays (e.g., in-store displays in an aisle), and/or any combination of features and displays. However, despite the presence of causal facts, the example pre-model data generator 208 calculates seasonality and trend index values to prevent data influences that are generally expected based on known seasonal effects (block 710). In other words, the seasonality index values and/or the trend index values normalize sales volume data. For example, seasonal effects may be apparent in view of barbeque sauce sales in summer months versus winter months. Additionally, the example pre-model data generator 208 may employ trading area sales data to further adjust seasonality index values based on geographic factors, such as a tendency for higher barbeque sauce sales in southern states versus northern states during the summer months.

The example pre-model data generator 208 also calculates one or more lift variables that span one or more time periods to facilitate volume calculations in accordance with cannibalization (block 712). As described above, cannibalization may occur when a manufacturer offers a new product or service, or promotes an existing product or service that takes sales or market share away from one or more of its own other products or services. As described in further detail below, the pre-model data generator 208 retrieves inter-brand and intra-brand weights (block 714), which are generated by the example weighting value generator 202, and calculates equivalent volumes and base equivalent volumes for competitive products (block 716). Based on competitor activity related to running a promotion, changing a product regular price, and/or introducing new UPCs on a store shelf, all of which tend to cause other competitive product sales to decrease, the example pre-model data generator 208 calculates corresponding competitive trade index values (block 718), calculates competitive regular price variables (block 720), and calculates competitive distribution variables (block 722), all of which are described in further detail below.

Figure 8:
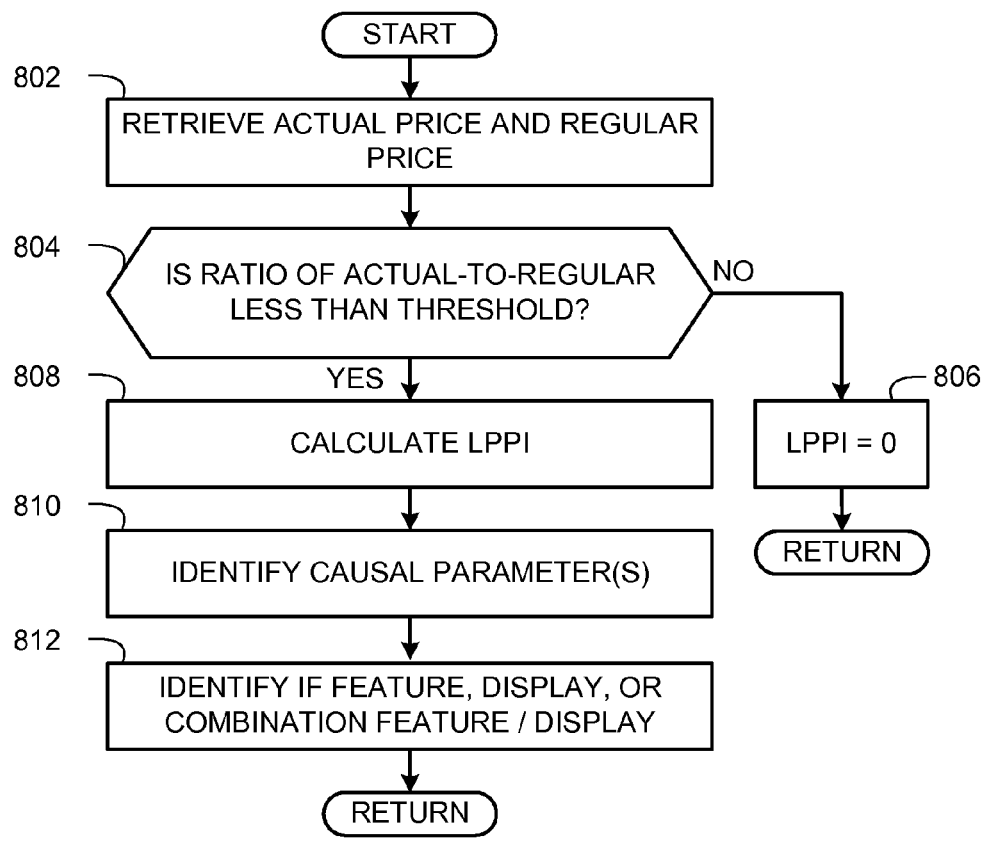
FIG. 8 illustrates a flow diagram representative of machine readable instructions that may be executed to determine causal facts in connection with the flow diagram of FIGS. 7A and 7B.

FIG. 8 is a flowchart representative of example machine readable instructions that may be executed to identify one or more causal facts associated with store-week-UPC data at block 708 of FIG. 7A. At block 802, the actual sale price (e.g., the current sale price) and the regular sale price of a product is retrieved. The example pre-model data generator 208 calculates the ratio/index of the actual sale price to the regular sale price and compares the result to a promoted price threshold (block 804). For example, a threshold of 0.96 may be selected by a user to identify instances where a promotion has actually occurred, such that any calculated ratio less than 0.96 is deemed to indicate that a promotion has occurred (e.g., actual price ($5.00)/regular price ($5.50)=0.90). A ratio/index value below the promoted price threshold is, thus, indicative of a valid trade promotion having a potential to affect sales of the target product of interest and/or one or more competitive products. If the ratio is not less than the promoted price threshold, then the promoted price index is deemed to be zero and the log of the promoted price index (LPPI) is set to zero (block 806). However, if the ratio is less than the threshold, then the LPPI is calculated (block 808) as set forth in Equation 1 below:

$$LPPI = \log \frac{\text{(Actual Price)}}{\text{(Regular Price)}} \quad \text{Equation 1}$$

To further distinguish one or more causal intercepts, the example pre-model data generator 208 queries the retrieved POS data for one or more causal parameters indicative of a feature, a display, a price reduction, or any combination thereof (block 810). In the event that there are no causal parameters associated with the product purchase, then no temporary price reduction has occurred. However, if the causal parameters have one or more non-zero mapping codes, then the pre-model data generator 208 identifies a valid trade promotion occurrence, such as a corresponding feature, display, or combination thereof (block 812).

Figure 9:
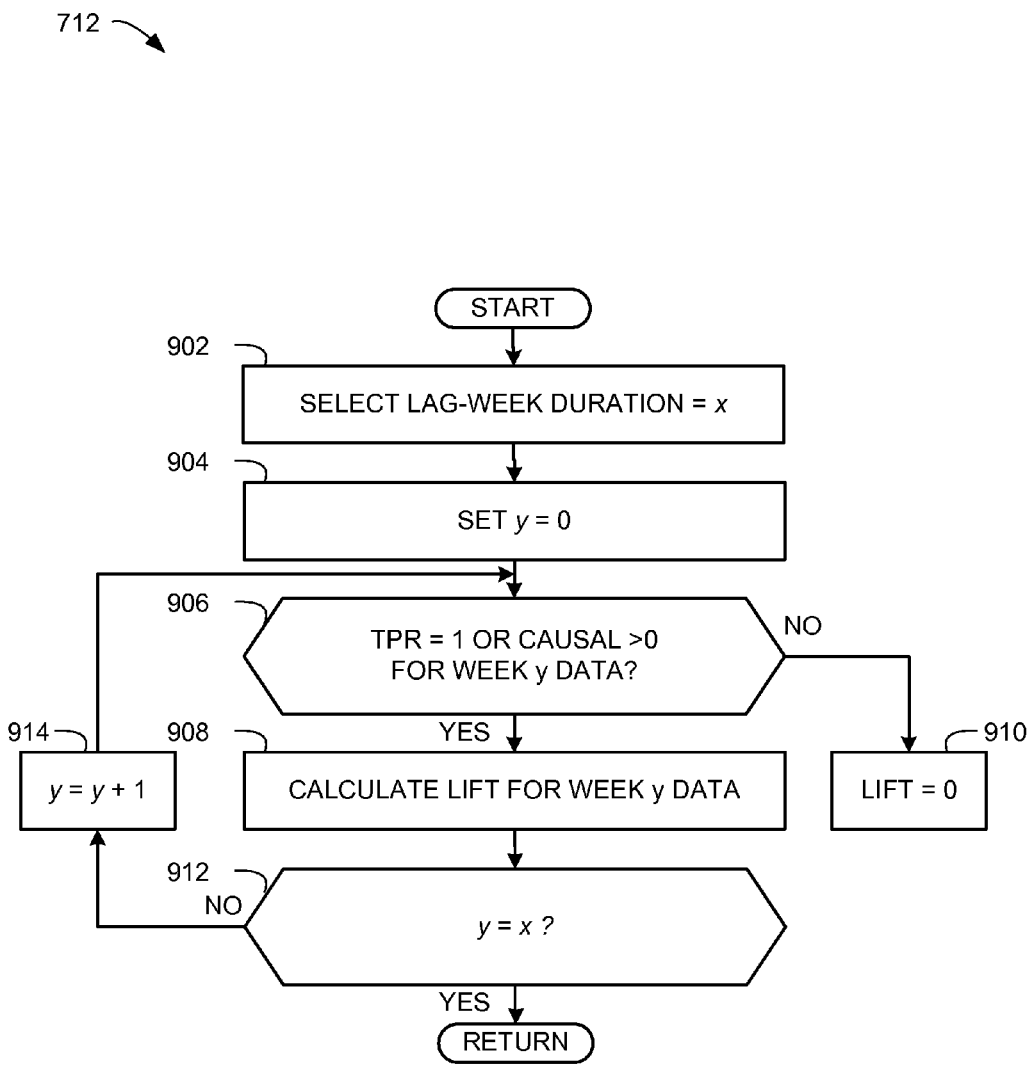
FIG. 9 illustrates a flow diagram representative of machine readable instructions that may be executed to calculate lift data in connection with the flow diagram of FIGS. 7A and 7B.

FIG. 9 is a flowchart representative of example machine readable instructions that may be executed to calculate forward buy cannibalization lift terms at block 712 of FIG. 7A. In other words, the calculation of lift terms represents a lagged effect over time, which facilitates volume calculations indicative of cannibalization effects. At block 902, a lag-week duration is selected. Any value for lag-week may be selected, the size of which determines how large a window of time is used to ascertain one or more lagged effects that may occur in response to one or more promotions. A working variable y is initially set to zero (block 904) to assist week-to-week looping of the retrieved store-week-UPC sales data. If the received data for any particular week of the loop is associated with a temporary price reduction or a causal parameter indicative of a promotion (block 906), as determined earlier by block 708, then lift is calculated for that week (block 908) as set forth in Equation 2 below.

$$\text{Lift} = \log \frac{\text{UnitsSold}}{\text{BaseUnits}} \quad \text{Equation 2}$$

In Equation 2 above, UnitsSold represents all sales while BaseUnits represents sales that would have occurred without any promotional activity. Additionally, the BaseUnits value includes any effects due to seasonality and trending. However, if the data associated with week y in the loop is not associated with a TPR or a causal parameter indicative of a promotion (block 906), then the lift is set to zero for week y (block 910). To accommodate all weeks for which the lift calculation is desired, the example pre-model data generator 208 determines if the loop variable y is equal to the selected lag-week duration in block 902 (block 912). If not, then the loop variable y is incremented by one (block 914) and control returns to block 906 to determine the lift variable value for the next week.

Figure 10:
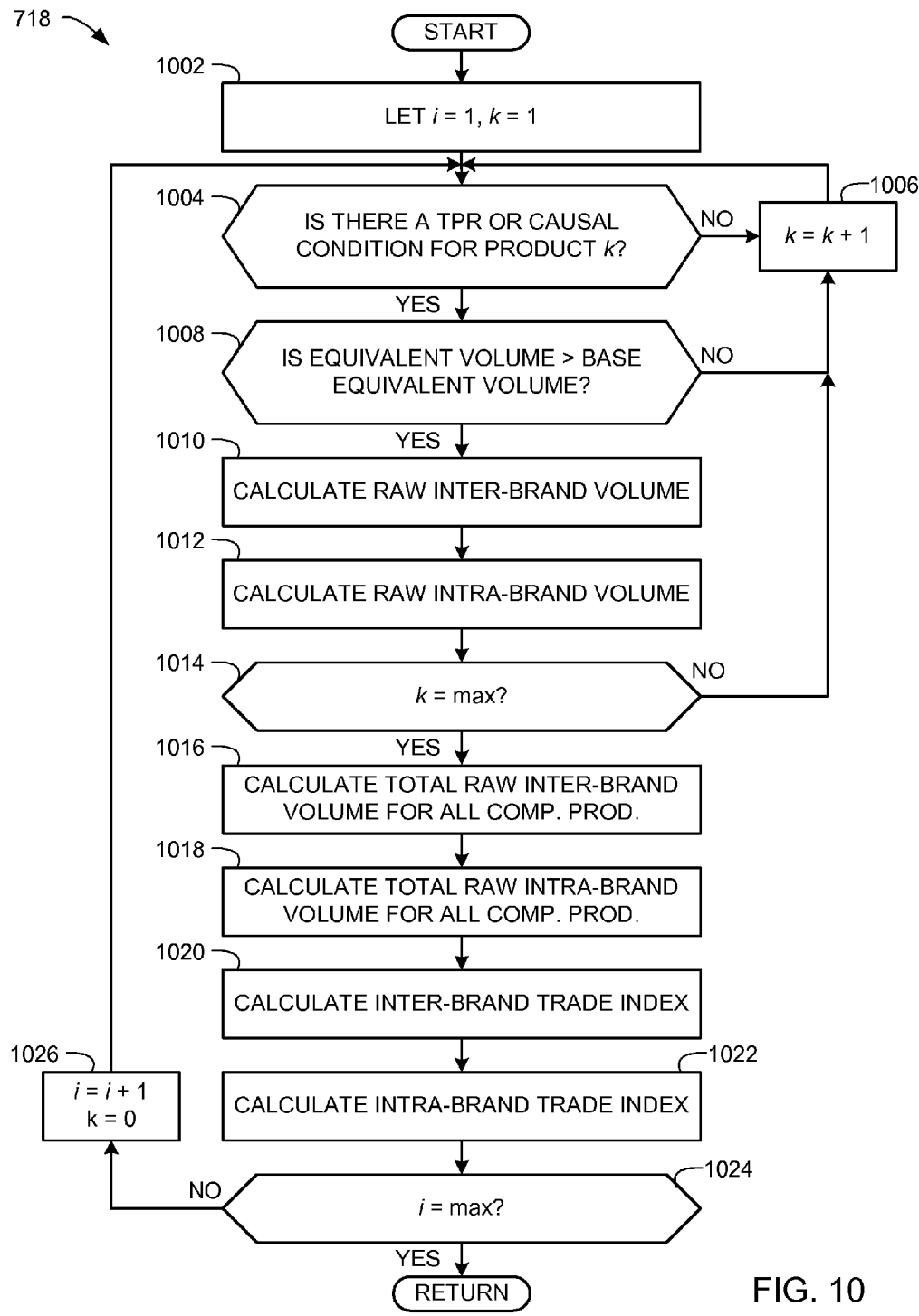
FIG. 10 illustrates a flow diagram representative of machine readable instructions that may be executed to calculate competitive trade data in connection with the flow diagram of FIGS. 7A and 7B.

FIG. 10 is representative of example machine readable instructions that may be executed to calculate competitive trade index values at block 718. At block 1002, a target item of interest is denoted by variable i and a competitive item is denoted by variable k. The example flowchart 718 illustrates a loop-operation to calculate corresponding trade index values for each item/product of interest and all corresponding competitive items of interest. Accordingly, for any given store-week of data, an equivalent volume and a base-equivalent volume are employed to accommodate for UPCs having disparate quantities (e.g., one UPC for Coke® sold in liters and another UPC for Coke® sold in ounces).

For each competitive product k, the example pre-model data generator 208 determines whether a temporary price reduction (TPR) has occurred or whether a causal condition is present that indicates promotional activity of the competitive product (block 1004). In the event that neither a TPR nor a causal condition is present (block 1004), then the variable k is incremented by one to evaluate another competitive product (block 1006). On the other hand, if a TPR or a causal condition is present (block 1004), then the example pre-model data generator 208 determines whether the equivalent volume is greater than the base equivalent volume (block 1008). In other words, if the equivalent volume is greater than the volume that would have occurred absent any promotion (i.e., the base equivalent volume), then the data associated with the competitive product related to variable k is likely to have experienced an effect associated with promotional activity. Additionally, the pre-model data generator calculates a magnitude of the volume difference between the equivalent volume and the base equivalent volume.

The raw inter-brand volume is calculated based on the inter-brand weighting values determined above (block 1010) as set forth in Equation 3 below.

$$\text{Raw Inter-Brand Volume}(i,k) = \beta_{Inter(i,k)} * (EqVol(k) - BeqVol(k)) \quad \text{Equation 3}$$

In Equation 3 above, $\beta_{Inter(i,k)}$ represents the Inter-Brand weight for the product of interest i as compared to the competitive product k. Additionally, EqVol(k) represents the equivalent volume of competitive product k, and BeqVol(k)

represents the corresponding equivalent volume of product k absent any promotional activity.

The raw intra-brand volume is calculated based on the intra-brand weighting values determined above (block 1012) as set forth in Equation 4 below.

$$\text{Raw Intra-Brand Volume}(i,k) = \beta_{intra(i,k)} * (EqVol(k) - BeqVol(k)) \quad \text{Equation 4}$$

In Equation 4 above, $\beta_{intra(i,k)}$ represents the Intra-Brand weight for the product of interest i as compared to another product k by that same manufacturer. In this case, EqVol(k) represents the equivalent volume of the manufacturer's product k, and BeqVol(k) represents the corresponding equivalent volume of the manufacturer's product k absent any promotional activity.

The value of variable k is compared against a maximum value as a condition to allow the loop to continue evaluating competitive products, if any (block 1014). However, once all competitive products and/or additional/alternate products by the same manufacturer have been evaluated for purposes of calculating the Raw Inter-Brand/Intra-Brand Volumes, the total Raw Inter-Brand Volume is calculated as the sum over all values of k (block 1016), and the total Raw Intra-Brand Volume is calculated as the sum over all values of k (block 1018).

As described above, one of the three things that a competitor can do to affect sales of the target product of interest is to increase or decrease the amount of trade promotion activity. To quantify that effect, the example pre-model data generator 208 calculates the Inter-Brand Weighted Trade Index for each target product of interest (block 1020) as set forth in Equation 5 below.

$$\text{Inter-Brand Weighted Trade} = \tanh\left(\frac{TotalRawInterBrandVol}{\max(BeqVol(i))}\right) \quad \text{Equation 5}$$

In Equation 5 above, BeqVol(i) represents the base equivalent volume for the target product associated with variable i.

Additionally, to determine potential cannibalization effects, the example pre-model data generator 208 calculates the Intra-Brand Weighted Trade Index for each target product of interest (block 1022) as set forth in Equation 6 below.

$$\text{Intra-Brand Weighted Trade} = \tanh\left(\frac{TotalRawIntraBrandVol}{\max(BeqVol(i))}\right) \quad \text{Equation 6}$$

In the event that there are additional target products of interest as determined by monitoring the variable i (block 1024), control advances to block 1026 to increment to the next target product of interest.

Figure 11:
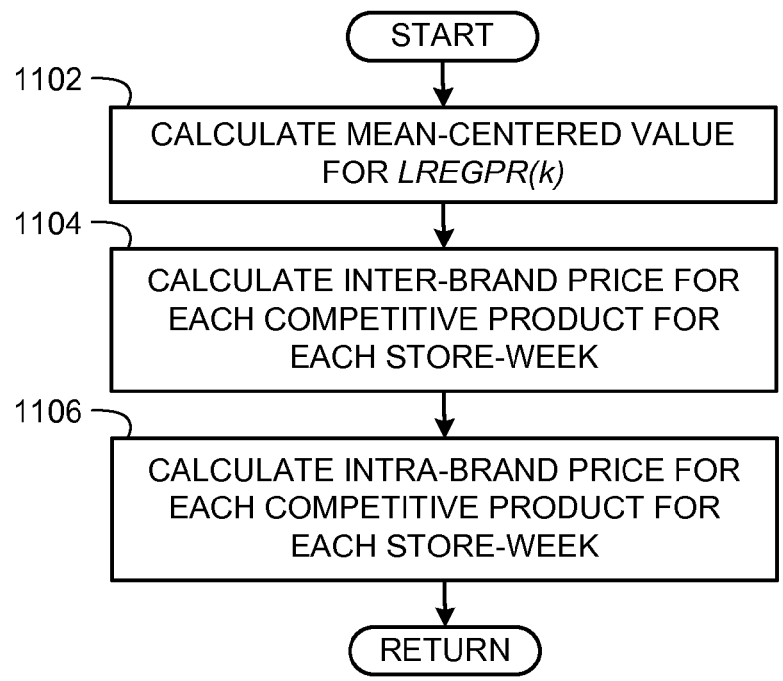
FIG. 11 illustrates a flow diagram representative of machine readable instructions that may be executed to calculate competitive regular price data in connection with the flow diagram of FIGS. 7A and 7B.

FIG. 11 is a flowchart representative of example machine readable instructions that may be executed to calculate competitive regular price variables at block 720 of FIG. 7B. At block 1102, the example pre-model data generator 208 calculates, for all store-week-UPCs, mean-center values for the value of the log of the regular price (LREGPR(k)). As discussed above, at least a second course of action that a competitor may take to affect volume sales is to change the regular price of a UPC item. To quantify this effect, the example pre-model data generator 208 calculates an inter-brand price for each competitive product (block 1104) as set forth in Equation 7 below.

$$\text{Inter-Brand Price} = \sum_{k=1}^{k=max} \beta_{Inter(i,k)} \times LREGPR(k) \quad \text{Equation 7}$$

In Equation 7 above, $\beta_{Inter(i,k)}$ represents the Inter-Brand weight for the product of interest i as compared to the competitive product k.

To quantify the price variable effects within the same brand as the target product of interest, the example pre-model data generator 208 calculates an intra-brand price for each alternate product that is also manufactured/produced by the manufacturer (block 1106) as set forth in Equation 8 below. For example, similar to a competitor changing a sale price that causes a corresponding drop in sales of the target product, so too can a drop in a sale price of one or more of the manufacturer's other products cause their volume sales of the target product of interest to drop.

$$\text{Intra-Brand Price} = \sum_{k=1}^{k=max} \beta_{Intra(i,k)} \times LREGPR(k) \quad \text{Equation 8}$$

In Equation 8 above, $\beta_{intra(i,k)}$ represents the Intra-Brand weight for the product of interest i as compared to another of the manufacturer's products k.

Figure 12:
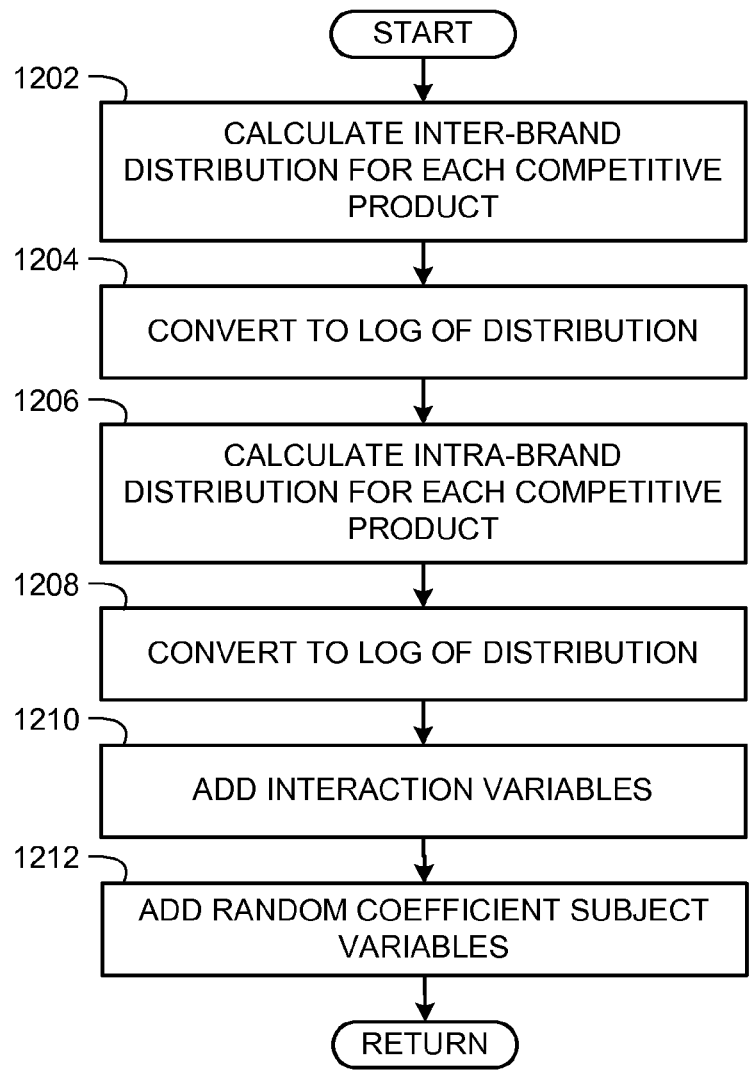
FIG. 12 illustrates a flow diagram representative of machine readable instructions that may be executed to calculate competitive distribution data in connection with the flow diagram of FIGS. 7A and 7B.

FIG. 12 is a flowchart representative of example machine readable instructions that may be executed to calculate competitive distribution variables at block 722 of FIG. 7B. As described above, at least a third activity that a competitor can take that may adversely affect sales of a target product of interest is to introduce additional UPCs on a store shelf. To quantify this effect, the flowchart 722 of FIG. 12 begins at block 1202, in which the inter-brand distribution is calculated (block 1202) as set forth in Equation 9 below.

$$\text{Inter-Brand Distribution} = \sum_{k=1}^{k=max} \beta_{Inter(i,k)} \times SELL(k) \quad \text{Equation 9}$$

In Equation 9 above, SELL(k) represents an indication that the particular product sold within a pre-determined number of weeks on a store shelf (e.g., a shelf duration). Specifically, some items may sit on a retail shelf for a relatively long period of time. As the shelf duration increases, the likelihood that the product will ultimately be sold drops. To smooth out potential problems related to slow moving sales, the SELL(k) variable is set to a value of one if the average number of UPCs for that product is greater than zero for the pre-determined number of weeks.

To accommodate to future modeling application, the log of the Inter-Brand Distribution is calculated (block 1204), as shown in Equation 10 below.

$$\text{Log(Inter-Brand Distribution)} = \log(1 + (\text{Inter-Brand Distribution})) \quad \text{Equation 10}$$

Similarly, to quantify the effects of volume sales of the target product when the same manufacturer introduces new and/or alternate UPCs on the store shelf, the example pre-model data generator 208 calculates the Intra-Brand Distribution (block 1206) as set forth in Equation 11 below.

$$\text{Intra-Brand Distribution} = \sum_{k=1}^{k=max} \beta_{Intra(i,k)} \times \text{MEAN\_NUMUPC}(k) \quad \text{Equation 11}$$

In Equation 11 above, $\beta_{Intra(i,k)}$ represents the Intra-Brand weight for the product of interest i as compared to another of the manufacturer's products k. MEAN_NUMUPC(k) represents the mean number of sold UPCs by each store-time period, such as, for example, a quadweek.

To allow for use in one or more future modeling applications, the log of the Intra-Brand Distribution is calculated (block 1208), as shown in Equation 12 below.

$$\text{Log(Intra-Brand Distribution)} = \log(1 + (\text{Intra-Brand Distribution})) \quad \text{Equation 12}$$

To accommodate one or more interaction effects of independent variables with other variables, the example pre-model data generator 208 includes the addition of interaction variables based on user preferences related to model customization (block 1210). For example, interaction variables may include, but are not limited to store categories that exhibit one or more predictive tendencies, such as some stores having a relatively high sales volume with diapers, and other stores having a relatively high sales volume with beer. Additionally, interaction variables related to known percentages of shoppers that are Hispanic, African American, Polish American, and/or geographic-based scores may be added.

To accommodate one or more random coefficients typically employed in some regression models, random coefficient models, and/or variance components models, the example pre-model data generator 208 adds one or more random coefficient subject variables (block 1212). Depending on the type of modeling approach selected by the user, certain assumptions and/or heuristics are applied to the coefficients that change based on the causal effects. For example, some of the random coefficient subject variables are unique based on whether the causal type is for a feature, a display, a combination of a feature and a display, or whether there is no promotional activity involved. Without limitation, other random coefficient subject variables are unique based on a feature advertisement size and/or location, such as the display being located at the end of an aisle, front of an aisle, and/or in a store lobby.

Figure 13:
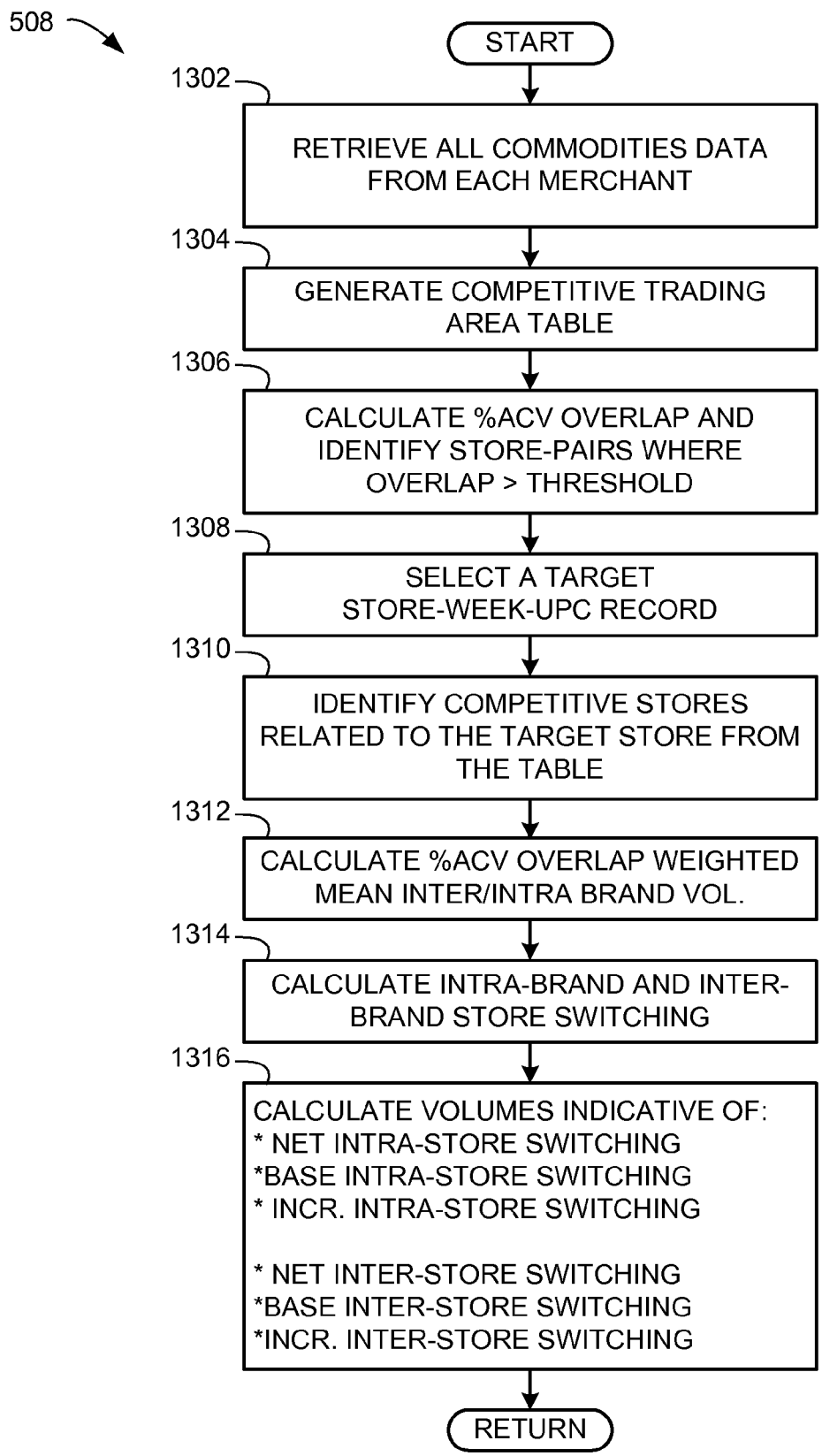
FIG. 13 illustrates a flow diagram representative of machine readable instructions that may be executed to calculate trading area data in connection with the flow diagram of FIG. 5.

Briefly returning to FIG. 5, the example flowchart also includes machine readable instructions that may be executed to perform trading area calculations (block 508). Turning to FIG. 13, an example flowchart of block 508 is shown in greater detail and begins at block 1302, at which the example trading area competitive activity assessor 206 retrieves all commodities volume (ACV) data from each merchant (e.g., retailer, wholesaler, etc.). At least one source of ACV data includes the Spectra® services provided by ACNielsen® that, in part, build, manage, and maintain data sources related to store trading areas, demographics, social characteristics, and/or economic characteristics. The example trading area competitive activity assessor 206 connects to the Spectra® services and/or any other trading area data source, which stores such trading area data in the example trading area sales data store 218. Without limitation, the trading area competitive activity assessor 206 may retrieve subsets of trading area data from the trading area sales data store 218 that are relevant to the geographic region(s) of interest. Contents of the trading area ACV data include, but are not limited to, store name, store identification value(s), store characteristics (e.g., TDLinx® characteristics), geographic information, and/or geodemographic information.

A competitive trading area table is generated by the example trading area competitive activity assessor 206 for each target store of interest (block 1304). The table includes a compiled list of competitive stores that surround the target store and which reside in the same relevant geographic area, such as the same state, the same county, and/or the same census block(s). However, the table discards other stores having the same organizational name as the target store (e.g., discard duplicate Jewel® stores that may have some census block overlap). Each census block may have varying degrees of overlap between the target store and a competitive store, thus the example trading area competitive activity assessor 206 calculates a percentage overlap of the ACV data to identify store-pairs that exceed a threshold value (block 1306) as set forth in Equation 13 below.

$$\text{\% ACV Overlap} = (\text{Trading Area Overlap})/(\text{Target Store ACV}) \quad \text{Equation 13}$$

A user may select a threshold value of 0% in the event that analysis of all overlapping conditions is desired, while other users may select a higher threshold value when analysis of more significant census block overlapping conditions is desired.

Independent trading area variables are calculated by the example activity assessor 206 to be used in one or more models, as described above. A target-store-week-UPC record is selected from the example transformed data repository 222 (block 1308), which was previously generated by the example pre-model data generator 208 described above. Based on the selected record, a corresponding set of competitive stores related to the target store are selected (extracted) from the table (block 1310) that was generated in block 1304. For each identified competitive store related to the target store, the example activity assessor 206 calculates a percent overlap weighted mean of the inter-brand and intra-brand volumes (block 1312). In effect, a resulting table includes summed values for the inter-brand and intra-brand incremental volumes for all competitive stores related to each target-store-UPC.

To further facilitate calculation of factor-contributive sub-volumes (due-to driver scoring calculations), the example trading area competitive activity assessor 206 calculates inter-brand store switching and intra-brand store switching values via, for example, Equations 14 and 15 below (block 1314).

$$\text{Inter-Brand-Store-}Sw = \log\left(1 + \frac{TotalInterBrandIncrementalVol}{BaseEquivalentVol}\right) \quad \text{Equation 14}$$

$$\text{Intra-Brand-Store-}Sw = \log\left(1 + \frac{TotalIntraBrandIncrementalVol}{BaseEquivalentVol}\right) \quad \text{Equation 15}$$

In Equations 14 and 15 above, the BaseEquivalentVol is the target item base equivalent volume.

The independent variables of Equations 14 and 15 are multiplied by model coefficients to generate intermediate store-specific variables for use in calculating factor-contributive-sub-volumes (e.g., due-to net store-switching, base store-switching, and incremental store-switching for both inter-brand and intra-brand circumstances). The example trading area competitive activity assessor 206 retrieves an inter-brand store-switching coefficient ($\beta_{InterSS}$), and an intra-brand store-switching coefficient ($\beta_{IntraSS}$) from the model to calculate the intermediate variables BetaInterBrandStore and BetaIntraBrandStore as shown below in Equations 16 and 17.

BetaInterBrandStore=($\beta_{InterSS}$)×Inter-Brand-Store-Sw   Equation 16

BetaIntraBrandStore=($\beta_{IntraSS}$)×Intra-Brand-Store-Sw   Equation 17

The example trading area competitive activity assessor 206 next calculates the factor-contributive-sub-volumes (block 1316), which represent sub-volume quantities that are attributed to (due to) one or more factors. In particular, the activity assessor 206 facilitates determining sub-volumes related to factors of competitive stores and/or same-stores (e.g., cannibalistic effects) in the trading area. In the illustrated example of FIG. 13, the activity assessor is configured to employ Equation 18 below to calculate the net sub-volume due to intra-brand store switching. Additionally, example Equation 19 builds upon results from Equation 18 to calculate the base sub-volume due-to intra-brand store switching, and example Equation 20 further builds upon Equation 19 to calculate the incremental sub-volume due to intra-brand store switching.

Net *SubVol IntraBrand* Store Switching=   Equation 18
[exp(*BetaIntraBrandStore*) − 1] ×
MAXIMUM[UNITS, base units]

Base *SubVol IntraBrand* Store Switching=   Equation 19
Net *SubVol IntraBrand* Store Switching×
$$\frac{\text{base units}}{\text{MAXIMUM[UNITS, base units]}}$$

Incremental *SubVol IntraBrand* Store Switching=   Equation 20
(Net *SubVol IntraBrand* Store Switching) −
(Base *SubVol IntraBrand* Store Switching)

In Equation 18 above, the factor-contributive sub-volume related to intra-brand net sub-volume is determined by subtracting one from the exponential value of the intermediate variable from Equation 17. The result is then multiplied by the maximum value of the corresponding UNITS volume and the corresponding base units volume for the store-week-UPC.

While example Equations 18-20 above may be used to calculate net, base, and incremental factor-contributive sub-volumes related to intra-brand effects, the example trading area competitive activity assessor 206 facilitates determining sub-volumes related to factors of inter-brand store switching (i.e., competitive stores). In the illustrated example of FIG. 13, the activity assessor 206 is configured to employ Equation 21 below to calculate the net sub-volume due to inter-brand store switching. Much like the progress of example Equations 18-20 above, Equations 22 and 23 below build-upon the calculations of example Equation 21 to calculate the base sub-volume due-to inter-brand store switching and to calculate the incremental sub-volume due to inter-brand store switching, respectively.

Net *SubVol InterBrand* Store Switching=   Equation 21
[exp(*BetaInterBrandStore*) − 1] ×
MAXIMUM[UNITS, base units]

Base *SubVol InterBrand* Store Switching=   Equation 22
Net *SubVol InterBrand* Store Switching×
$$\frac{\text{base units}}{\text{MAXIMUM[UNITS, base units]}}$$

Incremental *SubVol InterBrand* Store Switching=   Equation 23
(Net *SubVol InterBrand* Store Switching) −
(Base *SubVol InterBrand* Store Switching)

Similar to example Equation 18, Equation 21 above determines the factor-contributive sub-volume related to inter-brand net sub-volume by subtracting one from the exponential value of the intermediate variable from Equation 16. The result is then multiplied by the maximum value of the corresponding UNITS volume and the corresponding base units volume for the store-week-UPC.

Figure 14A:
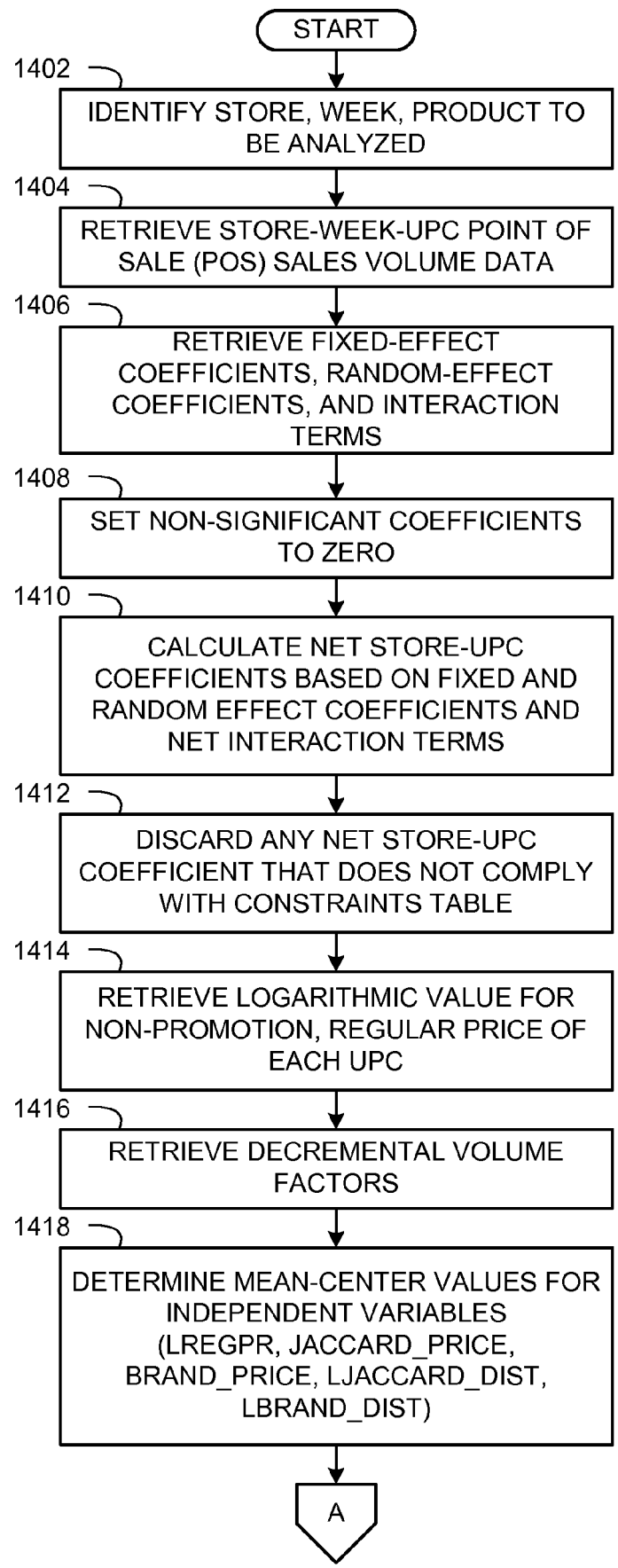
FIGS. 14A and 14B illustrate a flow diagram representative of machine readable instructions that may be executed to determine base driver volume data in connection with the flow diagram of FIG. 4.
Figure 14B:
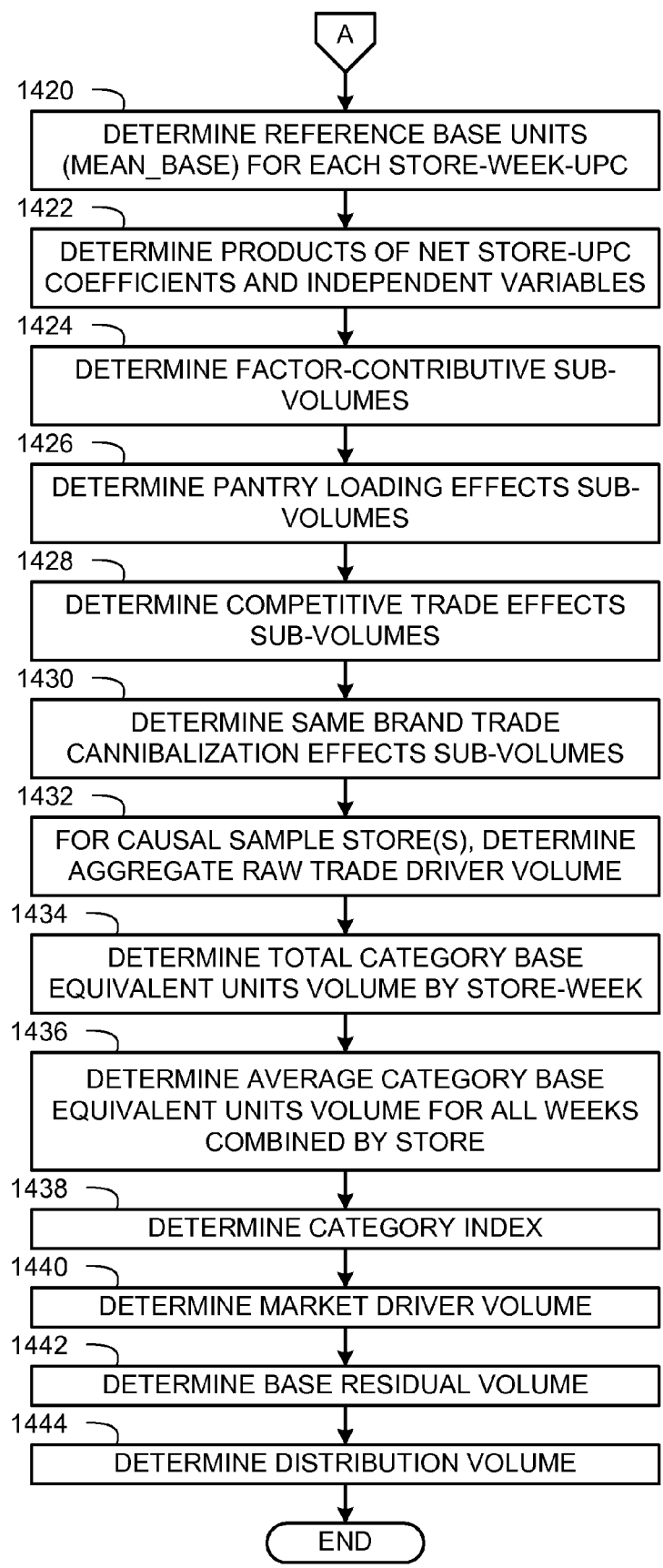
Figure 15A:
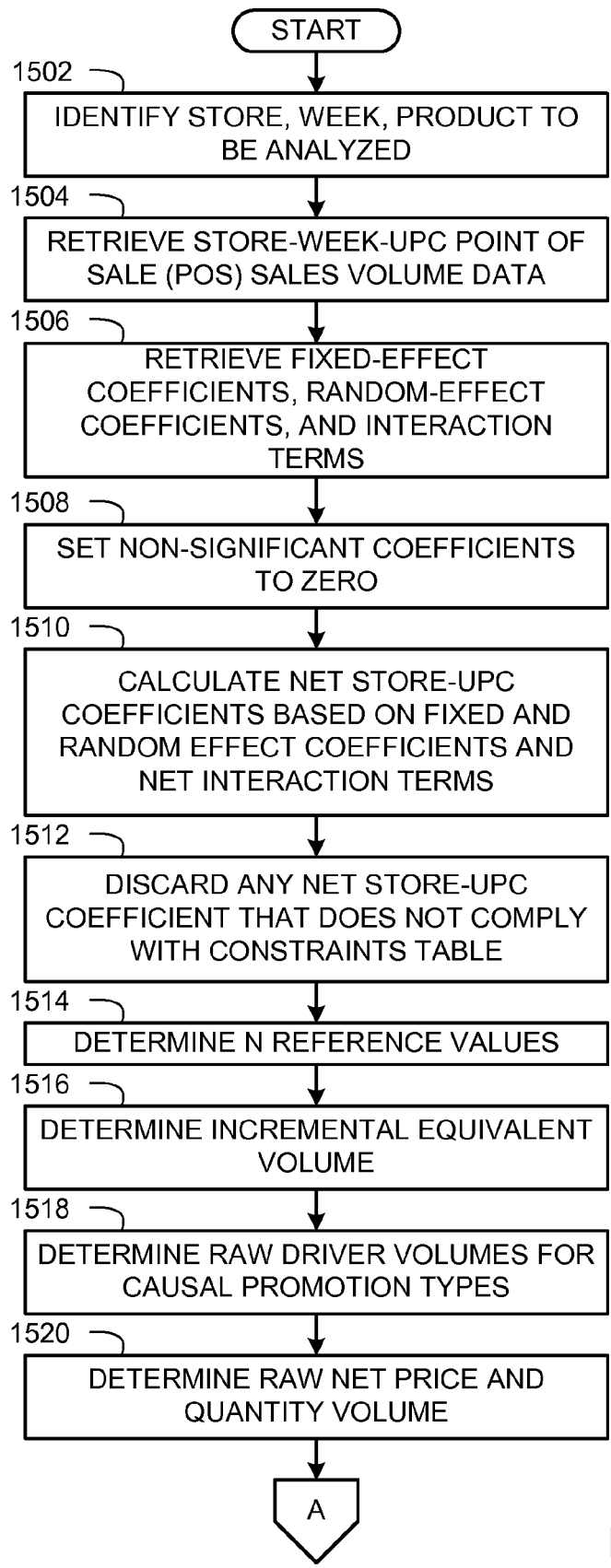
FIGS. 15A and 15B illustrate a flow diagram representative of machine readable instructions that may be executed to determine incremental driver volume data in connection with the flow diagram of FIG. 4.
Figure 15B:
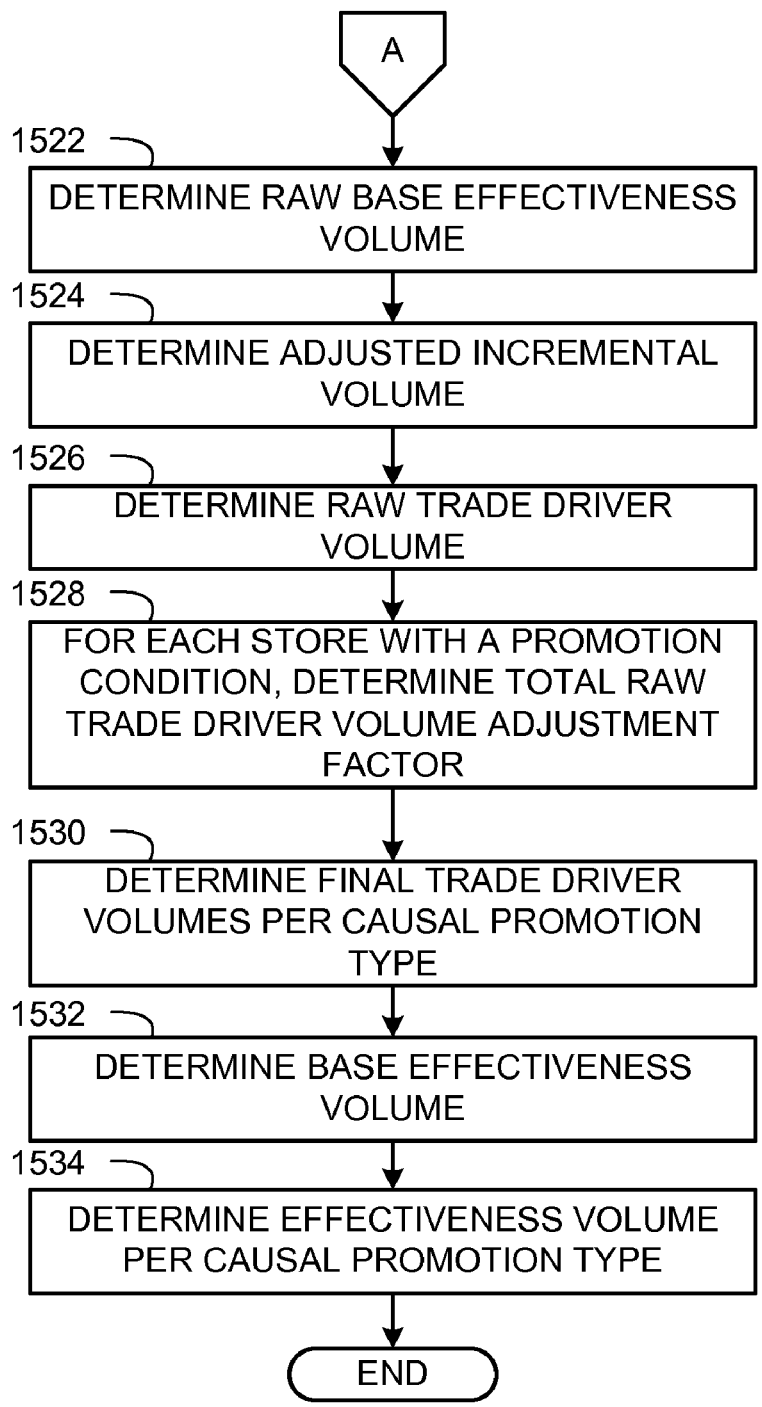

Briefly returning to FIG. 4, the illustrated example application of prepared data and model coefficients to scoring algorithms (block 406) is shown in greater detail in FIGS. 14A, 14B, 15A, and 15B. In particular, FIGS. 14A and 14B illustrate additional detail related to base driver scoring calculations, while the example of FIGS. 15A and 15B illustrates additional detail related to incremental trade driver scoring calculations.

Turning to FIGS. 14A and 14B, initially, the base driver data generator 228 identifies the store, week, and product to be analyzed (block 1402). For example, the store, week, and/or product may be selected by a user to specify that the user elects to analyze the sales volume of a particular product (represented by one or more unique UPCs) during a particular week and/or at a particular store (i.e., store-week-UPC sales volume), and the base driver data generator 228 can retrieve the user's selection. In some example implementations, two or more products may be analyzed simultaneously.

The base driver data generator 228 retrieves the store-week-UPC POS sales volume data (block 1404) from the sales data repository 220 for each product selected at block 1402. Alternatively, the base driver data generator 228 may retrieve week-UPC sales volume data for a focus on products independent of one or more store-based effects. As also described above, in some example implementations the sales volume may correspond to the sales of a product sold in one packaging size (e.g., two-liter soda), in which case the sales volume data is retrieved based on only one unique UPC. In other instances, the sales volume may correspond to the sales of a product sold in two or more packaging sizes (e.g., two-liter bottles, 12-ounce cans, 6-ounce cans, 24-ounce bottles), in which case the sales volume data is retrieved based on two or more unique UPCs. In either case, the sales volume analyses described herein can be performed using base equivalent units by representing the sales volumes using common (e.g., normalized), standard volumetric units (or piece-count units). For example, if a soda product is sold in different packaging sizes, the sales volume analyses can convert the POS sales volume data for each packaging type into ounces such that a sale of a two-liter bottle would represent a sale of sixty-eight ounces of soda based on a base equivalent measure, while a sale of a six-pack of twelve-ounce cans would represent a sale of seventy-two ounces of soda based on the same base equivalent measure.

The base driver data generator 228 then retrieves model coefficients (fixed-effect coefficients and random-effect coefficients) and net interaction terms from the model coefficients repository 224 (block 1406) and sets any non-significant fixed effect coefficients and non-significant random effect coefficients to zero (block 1408). The base driver data generator 228 then calculates net store-UPC coefficients (block 1410) based on the remaining, significant fixed and random effect coefficients and net interaction terms. In the illustrated example, net store-UPC coefficients are analysis-specific coefficients that represent different sales volumes effects for products in a particular store. While the model coefficients can be used to represent higher granularities of different effects on sales volumes, each net store-UPC coefficient can represent two or more aggregated model coefficients having similar sales volumes effects. In the illustrative example, the net store-UPC coefficients include a logarithmic regular price coefficient ($\beta_{RP}$), a lift coefficient ($\beta_L$), an inter-brand trade coefficient ($\beta_{interT}$) an intra-brand trade coefficient ($\beta_{intraT}$), an inter-brand price coefficient ($\beta_{interP}$), an intra-brand price coefficient ($\beta_{intraP}$), an inter-brand distribution coefficient ($\beta_{interD}$), and an intra-brand distribution coefficient ($\beta_{intraD}$).

The base driver data generator 228 can determine the net store-UPC coefficients at block 1410 by aggregating the corresponding fixed and random coefficients and also applying net interaction terms to quantify the effects that the interactions between different coefficients have on the resulting net store-UPC coefficients. In example implementations in which two or more products are selected at block 1402, the operation of block 1406 can retrieve model coefficients for each product, and the operation of block 1410 can be performed for each product to determine respective net store-UPC coefficients for each product based on its respective coefficients.

The base driver data generator 228 then discards any net store-UPC coefficient value that does not comply with a constraints table (block 1412). The constraints table can be used to store rules to be satisfied or met by calculated net store-UPC coefficients to determine whether the net store-UPC coefficients are statistically correct. In the illustrated example, a constraints table is used to store positive indicators and negative indicators to indicate whether it is plausible for a coefficient to represent an increase in sales. For example, if a constraint is indicative of positive growth (which is typically the case when a promotion is run) and a net store-UPC coefficient calculated at block 1410 represents a decrease in sales, then the calculated net store-UPC coefficient is discarded at block 1412 as a statistical outlier. Inconsistent or statistical outlier net store-UPC coefficients may be attributed to missing sales data, incorrectly recorded or collected data or any other error or misstep in the data handling process. Discarding inconsistent net store-UPC coefficients at block 1412 reduces the chances of incorrectly influencing volume sales analyses.

The base driver data generator 228 retrieves the independent logarithmic value for the non-promotion, regular price (LREGPR) of each UPC selected at block 1402 (block 1414). In the illustrated example, the base driver data generator 228 retrieves the independent variable LREGPR for each UPC from the transformed data repository 222. The base driver data generator 228 also retrieves independent variable decremental effect factors from the transformed data repository 222 (block 1416). Independent variable decremental volume factors (sometimes referred to herein as decremental effect factors) are factors having a decremental effect on the sales volume(s) calculated at block 1410 for the products) selected at block 1402. In the illustrated example, the independent variable decremental effect factors include, but are not limited to pantry loading (cannibalization) terms LIFT1=>LIFTn, inter-brand weighted category trade factors (INTER_TRADE), intra-brand weighted category factors (INTRA_TRADE), inter-brand weighted regular price factors (INTER_PRICE), intra-brand weighted regular price factors (INTRA_PRICE), inter-brand weighted distribution factors (LINTER_DIST), and intra-brand weighted distribution factors (LINTRA_DIST).

The base driver data generator 228 determines mean-center values for independent pre-selected independent variables (1418). In the illustrated example, the pre-selected independent variables include LREGPR, INTER_PRICE, INTRA_PRICE, LINTER_DIST, and LINTRA_DIST. The base driver data generator 228 also retrieves the reference base unit volume (MEAN_BASE) for each store-week-UPC identified at block 1402 (block 1420 of FIG. 14B). The reference base unit volume for each product is the mean sales volume for that product over a predetermined duration (e.g., a plurality of weeks) and is representative of typical sales of that product over that duration.

The base driver data generator 228 and/or the scoring processor determines the products of net store-UPC coefficients and respective independent variables to generate decremental effect terms (block 1422). The net store-UPC coefficients are selected from those determined above at block 1410 and the independent variables are those retrieved at block 1416 (some of which were mean-centered at block 1418). Thus, the product values (e.g., store-UPC coefficient terms, decremental effect terms), which may be represented as decremental effect terms are determined by the base driver data generator 228 are, for example, ($\beta_{RP}$×LREGPR), ($\beta_{interT}$×INTER_TRADE), ($\beta_{intraT}$×INTRA_TRADE), ($\beta_{interP}$×INTER_PRICE), ($\beta_{intraP}$×INTRA_PRICE) ($\beta_{interD}$×LINTER_DIST), ($\beta_{intraD}$×LINTRA_DIST), and ($\beta_{LIFT1}$×LIFT1) through ($\beta_{LIFTn}$×LIFTn). In addition, a pantry loading store-UPC coefficient term ($\beta_{pantry}$×PANTRY), which may be represented as a pantry loading effect term, can be determined by summing the LIFT store-UPC coefficient terms (($\beta_{LIFT1}$×LIFT1 ... $\beta_{LIFTn}$×LIFTn).

The base driver data generator 228 determines factor-contributive sub-volumes (block 1424). Factor-contributive sub-volumes represent sub-volume quantities attributed to (or due to) respective factors that, when aggregated, account for an entire dip (decrease) or spike (increase) in sales volumes. For example, factors A, B, and C correspond to respective ones of factor-A sub-volume, factor-B sub-volume, and factor-C sub-volume that, when summed, quantify an entire observed volume (i.e., total observed volume=sum(factor-A sub-volume, factor-B sub-volume, factor-C sub-volume). In the illustrated example, the base driver data generator 228 can be configured to use Equation 24 below to determine a regular price factor-contributive sub-volume, an inter-brand weighted regular price factor-contributive sub-volume, an intra-brand weighted regular price factor-contributive sub-volume, an inter-brand distribution factor-contributive sub-volume, and an intra-brand distribution factor-contributive sub-volume.

$$\text{factor-contributive sub-volume} = \left[1 - \frac{1}{\exp(\text{store} - UPC\ \text{coeff term})}\right] \times \text{MEAN\_BASE} \quad \text{Equation 24}$$

In Equation 24 above, a factor-contributive sub-volume is determined by subtracting one from the inverse value of the exponential value of a corresponding store-UPC coefficient term determined above at block 1422. The result is then multiplied by the reference base unit volume (MEAN_BASE) for a corresponding store-week-UPC.

The base driver data generator 228 determines pantry loading effect sub-volumes (block 1426) as set forth in Equation 25 below. For example, the base driver data generator 228 can be configured to use Equation 25 below to determine a pantry loading net factor-contributive sub-volume.

$$\text{pantry loading net factor} - \text{contributive sub-volume} = \left[1 - \frac{1}{\exp(\beta_{pantry} \times \text{PANTRY})}\right] \times \text{MAXIMUM[UNITS, base units]} \quad \text{Equation 25}$$

In Equation 25 above, the pantry loading net factor-contributive sub-volume is determined by subtracting one from the inverse of the exponential value of the pantry loading store-UPC coefficient term ($\beta_{pantry} \times$PANTRY). The resulting value is then multiplied by the maximum value of the corresponding UNITS volume and the corresponding base units volume for the store-week-UPC.

In addition, the base driver data generator 228 can be configured to determine a pantry loading base factor-contributive sub-volume using Equation 26 below and a pantry loading incremental factor-contributive sub-volume using Equation 27 below.

$$\text{pantry loading base factor} - \text{contributive sub-volume} = \text{pantry loading net factor} - \text{contributive sub-volume} \times \left[\frac{\text{base units}}{\text{MAXIMUM[UNITS, base units]}}\right] \quad \text{Equation 26}$$

$$\text{pantry loading incremental factor} - \text{contributive sub-volume} = (\text{pantry loading net factor} - \text{contributive sub-volume}) - (\text{pantry loading base factor} - \text{contributive sub-volume}) \quad \text{Equation 27}$$

In Equation 26 above, the pantry loading base factor-contributive sub-volume is determined by multiplying the pantry loading net factor-contributive sub-volume by the quotient of corresponding base units volume divided by the maximum value of the corresponding UNITS volume and the corresponding base units volume for the store-week-UPC. In Equation 27 above, the pantry loading incremental factor-contributive sub-volume is determined by subtracting the pantry loading net factor-contributive sub-volume from the pantry loading base factor-contributive sub-volume.

The base driver data generator 228 then determines competitive trade effects sub-volumes (block 1428). For example, the base driver data generator 228 can use Equations 28, 29, and 30 below, which are similar to Equations 25-27 above.

$$\text{inter-trade net factor} - \text{contributive sub-volume} = \left[1 - \frac{1}{\exp(\beta_{interT} \times \text{INTER\_TRADE})}\right] \times \text{MAXIMUM[UNITS, base units]} \quad \text{Equation 28}$$

$$\text{inter-trade base factor} - \text{contributive sub-volume} = \text{inter-trade net factor} - \text{contributive sub-volume} \times \left[\frac{\text{base units}}{\text{MAXIMUM[UNITS, base units]}}\right] \quad \text{Equation 29}$$

$$\text{inter-trade incremental factor} - \text{contributive sub-volume} = (\text{inter-trade net factor} - \text{contributive sub-volume}) - (\text{inter-trade base factor} - \text{contributive sub-volume}) \quad \text{Equation 30}$$

The base driver data generator 228 then determines same brand trade cannibalization effects sub-volumes (block 1430). Cannibalization occurs when a company offers a new product or service that takes sales or market share from one or more of its already existing products or services. The base driver data generator 228 can be configured to determine the same brand trade cannibalization effects sub-volumes using Equations 31, 32, and 33 below, which are similar to Equations 25-27 above.

$$\text{intra-trade net factor} - \text{contributive sub-volume} = \left[1 - \frac{1}{\exp(\beta_{intraT} \times \text{INTRA\_TRADE})}\right] \times \text{MAXIMUM[UNITS, base units]} \quad \text{Equation 31}$$

$$\text{intra-trade base factor} - \text{contributive sub-volume} = \text{intra-trade net factor} - \text{contributive sub-volume} \times \left[\frac{\text{base units}}{\text{MAXIMUM[UNITS, base units]}}\right] \quad \text{Equation 32}$$

$$\text{intra-trade incremental factor} - \text{contributive sub-volume} = (\text{intra-trade net factor} - \text{contributive sub-volume}) - (\text{intra-trade base factor} - \text{contributive sub-volume}) \quad \text{Equation 33}$$

If the store identified at block 1402 is a causal sample store, the base driver data generator 228 determines the aggregate raw trade driver volume for the identified product(s) being analyzed (block 1432). A causal sample store is a store for which causal effect data and sales volumes are collected, while a volumetric (census) store is one for which only sales volumes are collected. The causal effect data collected at causal sample stores can be used to infer reasons for sales volumes at volumetric stores. The base driver data generator 228 can be configured to determine the aggregate raw trade driver volume using Equation 34 below.

$$\text{raw trade driver volume} = \text{sum(pantry loading incremental factor-contributive sub-volume, inter-trade incremental factor-contributive sub-volume, intra-trade incremental factor-contributive sub-volume)} \quad \text{Equation 34}$$

As shown in Equation 34 above, the raw trade driver volume is the sum of the pantry loading incremental factor-contributive sub-volume determined in Equation 27 above, the inter-trade incremental factor-contributive sub-volume determined in Equation 30 above, and the intra-trade incremental factor-contributive sub-volume determined in Equation 31 above.

The base driver data generator 228 determines the total category base equivalent units volume by store-week (block 1434) for a particular product. Base equivalent volumes are calculated to determine total product sold regardless of the products' packaging. In this manner, for example, regardless of whether brand A soda was sold in a two-liter bottle package or twelve-ounce cans, the base equivalent volume will reflect the total ounces of the product sold regardless of packaging. The base driver data generator 228 then determines the average category base equivalent units volume for all weeks combined by store (block 1436) for the particular product. For example, the base driver data generator 228 can use the total category base equivalent units volume determined at block 1434 to determine the mean of total category base equivalent units volume to calculate the average category base equivalents units volume at block 1436.

The base driver data generator 228 then determines a category index of a particular product (block 1438) by, for example, dividing the total category base equivalent units volume determined at block 1434 by the average category base equivalent units volume determined at block 1436. The base driver data generator 228 then determines a market driver volume (block 1440) using, for example, seasonality factors, trend factors, etc.

The base driver data generator 228 then determines the base residual volume of the product (block 1442) using, for example, Equation 35 below.

base residual volume=base units−sum(regular price factor-contributive sub-volume,inter-brand weighted regular price factor-contributive sub-volume,intra-brand weighted regular price factor-contributive sub-volume,inter-brand distribution factor-contributive sub-volume,intra-brand distribution factor-contributive sub-volume,pantry loading base factor-contributive sub-volume, inter-brand trade factor-contributive sub-volume, intra-brand trade factor-contributive sub-volume, other driver volume(s))   Equation 35

As shown in Equation 35 above, the base residual volume of a product is determined by subtracting the base units from the sum of the regular price factor-contributive sub-volume, the inter-brand weighted regular price factor-contributive sub-volume, the intra-brand weighted regular price factor-contributive sub-volume, the inter-brand distribution factor-contributive sub-volume, the intra-brand distribution factor-contributive sub-volume, the pantry loading base factor-contributive sub-volume, the inter-brand trade factor-contributive sub-volume, the intra-brand trade factor-contributive sub-volume, and any other driver volume(s).

The base driver data generator 228 then determines a distribution volume of the product (block 1444). For example, the base driver data generator can determine the distribution volume of the product by determining the mean of the base residual volume of the product determined at block 1442. The example process of FIGS. 14A and 14B is then ended.

Turning now to FIGS. 15A and 15B, initially, the incremental driver data generator 230 identifies the store, week, and product to be analyzed (block 1502). For example, the store, week, and product may be selected by a user to specify that the user elects to analyze the sales volume of a particular product (represented by one or more unique UPCs) during a particular week at a particular store (i.e., store-week-UPC sales volume), and the incremental driver data generator 230 can retrieve the user's selection. In some example implementations, two or more products may be analyzed simultaneously.

The incremental driver data generator 230 retrieves the store-week-UPC POS sales volume data (block 1504) from the sales data repository 220 for each product selected at block 1502. As discussed above in connection with block 1404 of FIG. 14A, the sales volume analyses described herein can be performed using base equivalent units by representing the sales volumes using common, standard volumetric units (or piece-count units) regardless of whether the retrieved sales volume corresponds to the sales of a product sold in one packaging size to the sales of a product sold in two or more different packaging sizes.

The incremental driver data generator 230 then retrieves model coefficients (fixed-effect coefficients and random-effect coefficients) and net interaction terms from the model coefficients repository 224 (block 1506) and sets any non-significant fixed effect coefficient and non-significant random effect coefficient to zero (block 1508). The incremental driver data generator 230 then calculates net store-UPC coefficients (block 1510) based on the remaining, significant fixed and random effect coefficients and net interaction terms. In the illustrative example, the net store-UPC coefficients include a logarithmic promoted price index coefficient ($\beta_{LPPI}$), a temporary price reduction (TPR) coefficient ($\beta_{TPR}$), a feature coefficient ($\beta_{feat}$), a display coefficient ($\beta_{disp}$), and a feature-display coefficient ($\beta_{featdisp}$).

The incremental driver data generator 230 can determine the net store-UPC coefficients at block 1510 by aggregating corresponding fixed and random coefficients and also applying net interaction terms to quantify the effects that the interactions between different coefficients have on the resulting net store-UPC coefficients. In example implementations in which two or more products are selected at block 1502, the operation of block 1506 can retrieve model coefficients for each product, and the operation of block 1510 can be performed for each product to determine respective net store-UPC coefficients for each product based on it respective coefficients.

The incremental driver data generator 230 then discards any net store-UPC coefficient value that does not comply with a constraints table (block 1512). The constraints table used at block 1512 is configured similarly to the constraints table described above in connection with block 1412 of FIG. 14A. Discarding inconsistent net store-UPC coefficients at block 1512 reduces the chances of incorrectly influencing volume sales analyses.

The incremental driver data generator 230 determines N reference fact values (block 1514). Each reference fact value corresponds to a different store-week-UPC identified at block 1502. Thus, N is equal to the number of store-week-UPC's used for the sales volume analysis. The reference fact values can be calculated once per year or at any other desired time. In the illustrated example, the reference fact values include a reference base equivalent (REFBE) units and a plurality of reference promoted price indices (PPI's). REFBE units represent the average base equivalent units sales volume for a particular UPC (or group of UPC's representing the same product sold in different packaging sizes) in a particular store. Base equivalent units are discussed above in connection with block 1404 of FIG. 14A.

The plurality of PPI's are neither store-specific nor UPC-specific, but instead represent ratios of actual prices-to-regular prices. The reference PPI's can be used to determine when promotions are present for different products. For example, during an analysis if the ratio of an actual price-to-regular price of a product is less than or equal to the reference PPI, it confirms that there is a promotion for that product. Otherwise, a promotion is not present when the actual price-to-regular price ratio is not less than or equal to the reference PPI. Each reference PPI corresponds to a corresponding type of promotion including a feature only promotion, a display only promotion, a hybrid feature-display promotion, or a price cut only promotion. A feature promotion is a circulated flyer (e.g., coupons or advertisements in newspapers, magazines, etc.) associated with the product. A display promotion is an in-store display (e.g., in-store posters, shelf talkers, coupon dispensers, etc.) promoting the product. A price cut promotion occurs when a product's price is reduced but is not advertised.

The incremental driver data generator 230 determines an incremental equivalent volume (block 1516) and raw driver volumes for causal promotion types (block 1518). In the illustrated example, the incremental driver data generator 230 determines the incremental equivalent volume and the raw driver volumes for causal promotion types based on the net store-UPC coefficients (i.e., logarithmic promoted price index coefficient ($\beta_{LPPI}$), temporary price reduction (TPR) coefficient ($\beta_{TPR}$), feature coefficient ($\beta_{feat}$), display coefficient ($\beta_{disp}$), and feature display coefficient ($\beta_{featdisp}$)) determined above at block 1510 and certain facts data for the product UPC(s) under analysis retrieved from the transformed data repository 222 (FIG. 2). The facts data include equivalent volume, base equivalent volume (BEV), actual price, regular price, causal promotion indicators (e.g., variable CAUSAL having example values 0-7), and temporary price reduction (TPR) flags (e.g., 1 if price cut, 0 otherwise). The facts data also include the reference facts determined above at block 1514. While the illustrated examples described herein use variable CAUSAL to indicate causal promotional activity, any other variable nomenclature and/or associated value(s) may be implemented to represent the same.

To determine the incremental equivalent volume at block 1516, the incremental driver data generator 230 subtracts the base equivalent volume from the equivalent volume (i.e., incremental equivalent volume=equivalent volume−base equivalent volume).

The raw driver volumes by causal promotion types determined at block 1518 include a price cut only raw driver volume, a feature only raw driver volume, a display only raw driver volume, and a feature-display raw driver volume. At block 1518, the incremental driver data generator 230 determines that a price cut only promotion exists for a product when its causal promotion indicator (e.g., CAUSAL) is equal to zero (i.e., CAUSAL=0) and a temporary price reduction flag is equal to one (i.e., TPR=1 to identify the occurrence of a temporary price reduction). If the price cut only promotion exists, then the incremental driver data generator 230 determines a price cut only raw quantity and price driver volume using Equations 36 and 37 below.

$$\text{price cut only raw quantity driver volume} = \{\exp(\beta_{TPR}) \times [(\text{reference PPI for price cut only})^{\hat{}}\beta_{LPPI}] - 1\} \times REFBE \quad \text{Equation 36}$$

$$\text{price cut only raw price driver volume} = \{\exp(\beta_{TPR}) \times [(\text{actual price/regular price})^{\hat{}}\beta_{LPPI}] - 1\} \times REFBE - \text{price cut only raw quantity driver volume} \quad \text{Equation 37}$$

Also at block 1518, the incremental driver data generator 230 determines that a feature only promotion exists for a product when its causal promotion indicator (e.g., CAUSAL) is equal to a value of one, two, or three (i.e., CAUSAL=1, 2, or 3). If a feature only promotion exists, then the incremental driver data generator 230 determines a feature only raw quantity and price driver volume using Equations 38 and 39 below.

$$\text{feature only raw quantity driver volume} = \{\exp(\beta_{feat}) \times [(\text{reference PPI for feature only})^{\hat{}}\beta_{LPPI}] - 1\} \times REFBE \quad \text{Equation 38}$$

$$\text{feature only raw price driver volume} = \{\exp(\beta_{feat}) \times [(\text{actual price/regular price})^{\hat{}}\beta_{LPPI}] - 1\} \times REFBE - \text{feature only raw quantity driver volume} \quad \text{Equation 39}$$

Also at block 1518, the incremental driver data generator 230 determines that a display only promotion exists for a product when its causal promotion indicator (e.g., CAUSAL) is equal to a value of four (i.e., CAUSAL=4). If a display only promotion exists, then the incremental driver data generator 230 determines a display only raw quantity and price driver volume using Equations 40 and 41 below.

$$\text{display only raw quantity driver volume} = \{\exp(\beta_{disp}) \times [(\text{reference PPI for display only})^{\hat{}}\beta_{LPPI}] - 1\} \times REFBE \quad \text{Equation 40}$$

$$\text{display only raw price driver volume} = \{\exp(\beta_{disp}) \times [(\text{actual price/regular price})^{\hat{}}\beta_{LPPI}] - 1\} \times REFBE - \text{display only raw quantity driver volume} \quad \text{Equation 41}$$

Also at block 1518, the incremental driver data generator 230 determines that a hybrid feature-display promotion exists for a product when its causal promotion indicator (e.g., CAUSAL) is equal to a value of five, six, or seven (i.e., CAUSAL=5, 6, or 7). If a hybrid feature-display promotion exists, then the incremental driver data generator 230 determines a hybrid feature-display raw quantity and price driver volume using Equations 42 and 43 below.

$$\text{feature-display raw quantity driver volume} = \{\exp(\beta_{featdisp}) \times [(\text{reference PPI for feature-display})^{\hat{}}\beta_{LPPI}] - 1\} \times REFBE \quad \text{Equation 42}$$

$$\text{feature-display raw price driver volume} = \{\exp(\beta_{feat\text{-}disp}) \times [(\text{actual price/regular price})^{\hat{}}\beta_{LPPI}] - 1\} \times REFBE - \text{feature-display raw quantity driver volume} \quad \text{Equation 43}$$

The incremental driver data generator 230 then determines the raw net price and quantity volume (block 1520) based on the raw driver volumes for each causal promotion type determined above at block 1518. In the illustrative example, the incremental driver data generator 230 determines the raw net price and quantity volume using Equation 44 below.

$$\text{raw net price and quantity volume} = \text{sum(price cut only raw quantity driver volume, price cut only raw price driver volume, feature only raw quantity driver volume, feature only raw price driver volume, display only raw quantity driver volume, display only raw price driver volume, feature-display raw quantity driver volume, feature-display raw price driver volume)} \quad \text{Equation 44}$$

The incremental driver data generator 230 then determines the raw base effectiveness volume (block 1522) based on the raw net price and quantity volume determined at block 1520 using, for example, Equation 46 below.

$$\text{raw base effectiveness volume} = (BE/REFBE - 1) \times \text{raw net price and quantity volume} \quad \text{Equation 45}$$

The incremental driver data generator 230 then determines the adjusted incremental volume (block 1524) using, for example, Equation 46 below.

$$\text{adjusted incremental volume} = (\text{incremental units}) - (\text{pantry loading incremental factor-contributive sub-volume}) - (\text{inter-brand incremental factor-contributive sub-volume}) - (\text{intra-brand incremental factor-contributive sub-volume}) \quad \text{Equation 46}$$

The pantry loading incremental factor-contributive sub-volume, the inter-brand incremental factor-contributive sub-volume, and the intra-brand incremental factor-contributive sub-volume used in Equation 46 above are determined as described above in connection with block 1426, 1428, and 1430 of FIG. 14B.

The incremental driver data generator 230 then determines a raw trade driver volume (block 1526) using, for example, Equation 47 below based on the raw net price and quantity volume determined at block 1520 and the raw base effectiveness volume determined at block 1522.

$$\text{raw trade driver volume} = \text{raw net price and quantity volume} + \text{raw base effectiveness volume} \quad \text{Equation 47}$$

Also for each store with a promotion condition, the incremental driver data generator 230 determines a lift factor adjustment (block 1528) for each UPC using, for example, dividing the adjusted incremental volume for that UPC (determined above at block 1524) by the total raw trade driver volume of that UPC (i.e., lift factor adjustment=adjusted incremental volume/total raw trade driver volume).

The incremental driver data generator 230 determines final trade driver volumes for each causal promotion type (block 1530). In the illustrative example, the incremental driver data generator 230 can be configured to use Equations 48 and 49 below to determine the final trade driver volumes for each causal promotion type.

{promotion type}quantity driver volume=(lift factor adjustment)×({promotion type}quantity raw driver volume)  Equation 48

{promotion type}price driver volume=(lift factor adjustment)×({promotion type}price raw driver volume)  Equation 49

In Equations 48 and 49 above, promotion type is one of price cut only, feature only, display only, or feature-display. The lift factor adjustment is determined above at block 1528, the {promotion type} quantity raw driver volumes for the different promotion types are determined above at block 1518, and the {promotion type} price raw driver volumes for the different promotion types are also determined above at block 1518.

The incremental driver data generator 230 determines a base effectiveness volume (block 1532) by, for example, multiplying the lift factor adjustment (determined at block 1528) by the raw base effectiveness volume (determined at block 1522) (i.e., (base effectiveness volume)=(lift factor adjustment)×(raw base effectiveness volume)). The incremental driver data generator 230 then determines the effectiveness volume for each causal promotion type (block 1534) using, for example, Equation 50 below.

{promotion type}effectiveness volume=(incremental equivalent volume)−(base effectiveness volume+{promotion type}quantity driver volume+{promotion type}price driver volume)  Equation 50

In Equation 50 above, the incremental equivalent volume is determined above at block 1516, the base effectiveness volume is determined above at block 1532, and the {promotion type} quantity driver volume and {promotion type} price driver volume are determined above at block 1530. The example process of FIGS. 15A and 15B is then ended.

FIG. 16 is a block diagram of an example processor system that may be used to implement some or all of the example methods and apparatus described herein. As shown in FIG. 16, the processor system 1610 includes a processor 1612 that is coupled to an interconnection bus 1614. The processor 1612 includes a register set or register space 1616, which is depicted in FIG. 16 as being entirely on-chip, but which could alternatively be located entirely or partially off-chip and directly coupled to the processor 1612 via dedicated electrical connections and/or via the interconnection bus 1614. The processor 1612 may be any suitable processor, processing unit or microprocessor. Although not shown in FIG. 16, the system 1610 may be a multi-processor system and, thus, may include one or more additional processors that are identical or similar to the processor 1612 and that are communicatively coupled to the interconnection bus 1614.

The processor 1612 of FIG. 16 is coupled to a chipset 1618, which includes a memory controller 1620 and an input/output (I/O) controller 1622. As is well known, a chipset typically provides I/O and memory management functions as well as a plurality of general purpose and/or special purpose registers, timers, etc. that are accessible or used by one or more processors coupled to the chipset 1618. The memory controller 1620 performs functions that enable the processor 1612 (or processors if there are multiple processors) to access a system memory 1624 and a mass storage memory 1625.

The system memory 1624 may include any desired type of volatile and/or non-volatile memory such as, for example, static random access memory (SRAM), dynamic random access memory (DRAM), flash memory, read-only memory (ROM), etc. The mass storage memory 1625 may include any desired type of mass storage device including hard disk drives, optical drives, tape storage devices, etc.

The I/O controller 1622 performs functions that enable the processor 1612 to communicate with peripheral input/output (I/O) devices 1626 and 1628 and a network interface 1630 via an I/O bus 1632. The I/O devices 1626 and 1628 may be any desired type of I/O device such as, for example, a keyboard, a video display or monitor, a mouse, etc. The network interface 1630 may be, for example, an Ethernet device, an asynchronous transfer mode (ATM) device, an 802.11 device, a DSL modem, a cable modem, a cellular modem, etc. that enables the processor system 1610 to communicate with another processor system.

While the memory controller 1620 and the I/O controller 1622 are depicted in FIG. 16 as separate functional blocks within the chipset 1618, the functions performed by these blocks may be integrated within a single semiconductor circuit or may be implemented using two or more separate integrated circuits.

Although the above description refers to the flowcharts as being representative of methods, those methods may be implemented entirely or in part by executing machine readable instructions. Therefore, the flowcharts are representative of methods and machine readable instructions. Additionally, one or more methods may be implemented entirely or in part by executing example pseudo code instructions, such as the example pseudo code instructions of FIGS. 17A-17E, 18A, 18B, 19A, 19B, 20A, 20B, and 21A through 21C. For example, FIGS. 17A-17E generally illustrate example pseudo code to prepare data for modeling in connection with the example system of FIG. 1. Additionally, example block 708 of FIG. 7A and FIG. 8 may be represented by example pseudo code section 1702 of FIG. 17A, example block 710 of FIG. 7A may be represented by the example pseudo code section 1704 of FIG. 17A, and example block 712 of FIG. 7A and FIG. 9 may be represented by the example pseudo code section 1706 of FIG. 17A. Further, example block 718 of FIG. 7A and FIG. 10 may be represented by example pseudo code section 1708 of FIG. 17B, and example block 720 of FIG. 7B and FIG. 11 may be represented by example pseudo code section 1710 of FIG. 17B. Moreover, example block 722 of FIG. 7B and FIG. 12 may be represented by example pseudo code section 1712 of FIG. 17C.

FIGS. 18A and 18B generally illustrate example pseudo code to prepare data for store switching calculations in connection with the example system of FIG. 1. For example, example blocks 1314 and 1316 of FIG. 13 may be represented by example pseudo code section 1802 of FIG. 18B. FIGS. 19A and 19B generally illustrate example pseudo code to specify model parameters in connection with the example system of FIG. 1. FIGS. 20A and 20B generally illustrate example pseudo code to perform base driver scoring calculations in connection with the example system of FIG. 1. For instance, example blocks 1416 and 1418 of FIG. 14A may be represented by example pseudo code section 2002 of FIG. 20A, example blocks 1420 and 1422 of FIG. 14B may be represented by example pseudo code section 2004 of FIG. 20A, and example blocks 1424 and 1426 of FIG. 14B may be represented by example pseudo code section 2006 of FIG. 20A. Additionally, example blocks 1428, 1430, 1432, 1434, and 1436 may be represented by example pseudo code section 2008 of FIG. 20B. FIGS. 21A-21C generally illustrate example pseudo code to perform incremental trade driver scoring calculations in connection with the example system of FIG. 1.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

The invention claimed is:

1. A computer implemented method of determining and reporting on a pantry loading effect on sales of a product under a promotion, comprising:

calculating, with a pre-model generator, a plurality of lift terms, each lift term indicative of a lag effect during a plurality of weeks and calculated by dividing the log of sales of the product during the promotion by sales of the product absent the promotion;

retrieving, with a base driver data generator, a plurality of decremental effect factors, each corresponding to a respective one of the plurality of weeks, wherein at least some of the decremental effect factors are indicative of a downward trend in sales of the product that was under the promotion during a first one of the plurality of weeks, and wherein the plurality of decremental effect factors include the plurality of lift terms;

determining, with a scoring processor, a plurality of decremental effect terms, each decremental effect term calculated by multiplying a corresponding coefficient by a corresponding one of the plurality of decremental effect factors, wherein the plurality of decremental effect terms include LIFT store-UPC coefficient terms, each of which is calculated by multiplying a corresponding store-UPC coefficient term by a corresponding one of the plurality of lift terms;

determining, with the scoring processor, a pantry loading effect term by summing the LIFT store-UPC coefficient terms;

determining, with an incremental driver data generator, a pantry loading incremental sub-volume based on the pantry loading effect term; and generating a report including the pantry loading incremental sub-volume.

2. A method as defined in claim 1, further comprising determining the plurality of decremental effect factors and terms when at least one of a temporary price reduction of the product has been detected or a promotion of the product has been detected.

3. A method as defined in claim 2, wherein the temporary price reduction has been detected when the price of the product is below a threshold price.

4. A method as defined in claim 1, wherein the plurality of decremental effect factors are associated with the sales of the product within a single store.

5. A method as defined in claim 1, wherein at least one of the plurality of decremental effect factors is equal to zero when an actual sales volume of the product for the week corresponding to the at least one of the plurality of decremental effect factors is greater than zero and the actual sales volume is greater than a base units sales volume.

6. A method as defined in claim 5, wherein the base units sales volume is representative of the sales volume for the product that would have occurred during the week corresponding to the at least one of the plurality of decremental effect factors absent the trade promotion during the first one of the plurality of weeks.

7. An apparatus to determine a pantry loading effect on sales of a product under a promotion, comprising:

a pre-model generator to calculate a plurality of lift terms, each lift term indicative of a lag effect during a plurality of weeks and calculated by dividing the log of sales of the product during the promotion by sales of the product absent the promotion;

a base driver data generator to retrieve a plurality of decremental effect factors, each factor corresponding to a respective one of the plurality of weeks during the promotion for the product, wherein the plurality of decremental effect factors include the plurality of lift terms;

a scoring processor to calculate a plurality of decremental effect terms, each decremental effect term calculated by multiplying a corresponding coefficient by a corresponding one of the plurality of decremental effect factors, wherein the plurality of decremental effect terms include LIFT store-UPC coefficient terms, each of which is calculated by multiplying a corresponding store-UPC coefficient term by a corresponding one of the plurality of lift terms;

the scoring processor further to calculate a pantry loading effect term by summing the LIFT store-UPC coefficient terms;

and an incremental driver data generator to calculate a pantry loading incremental sub-volume based on the pantry loading effect term.

8. An apparatus as defined in claim 7, further comprising a baseline volume manager to identify a downward trend in sales of the product based on the plurality of decremental effect factors, the product under the promotion condition during a first one of the plurality of weeks.

9. A tangible machine readable storage medium, excluding propagating signals, comprising instructions to determine and report on a pantry loading effect on sales of a product under a promotion, which, when executed, the instructions cause a machine to at least:

calculate a plurality of lift terms, each lift term indicative of a lag effect during a plurality of weeks and calculated by dividing the log of sales of the product during the promotion by sales of the product absent the promotion;

retrieve a plurality of decremental effect factors, each corresponding to a respective one of the plurality of weeks, wherein at least some of the decremental effect factors are indicative of a downward trend in sales of the product that was under the promotion during a first one of the plurality of weeks, and wherein the plurality of decremental effect factors include the plurality of lift terms;

determine a plurality of decremental effect terms, each decremental effect term calculated by multiplying a corresponding coefficient by a corresponding one of the plurality of decremental effect factors, wherein the plurality of decremental effect terms include LIFT store-UPC coefficient terms, each of which is calculated by multiplying a corresponding store-UPC coefficient term by a corresponding one of the plurality of lift terms;

determine a pantry loading effect term by summing the LIFT store-UPC coefficient terms;

determine a pantry loading incremental sub-volume based on the pantry loading effect term; and generate a report including the pantry loading incremental sub-volume.

10. A tangible machine readable storage medium as defined in claim 9, wherein the instructions, when executed, cause the machine to determine the plurality of decremental effect factors and terms when at least one of a temporary price reduction of the product has been detected or a promotion of the product has been detected.

11. A tangible machine readable storage medium as defined in claim 9, wherein the instructions, when executed, cause the machine to associate the plurality of decremental effect factors with the sales of the product within a single store.

* * * * *